United States Patent [19]

Johnson et al.

[11] Patent Number: 4,887,204
[45] Date of Patent: Dec. 12, 1989

[54] SYSTEM AND METHOD FOR ACCESSING REMOTE FILES IN A DISTRIBUTED NETWORKING ENVIRONMENT

[75] Inventors: Donavon W. Johnson, Georgetown; Grover H. Neuman; Charles H. Sauer, both of Austin; Amal A. Shaheen-Gouda; Todd A. Smith, both of Austin, all of Tex.

[73] Assignee: International Business Machines Corporation, Armonk, N.Y.

[21] Appl. No.: 14,897

[22] Filed: Feb. 13, 1987

[51] Int. Cl.⁴ ............................................. G06F 15/16
[52] U.S. Cl. ................................. 364/200; 364/283.1; 364/228.3; 364/243.41
[58] Field of Search ... 364/200 MS File, 900 MS File

[56] References Cited

U.S. PATENT DOCUMENTS

| | | | |
|---|---|---|---|
| 4,432,057 | 2/1984 | Daniell et al. | 364/200 |
| 4,484,267 | 11/1984 | Fletcher | 364/200 |
| 4,558,413 | 12/1985 | Schmidt et al. | 364/200 |
| 4,714,992 | 12/1987 | Gladney et al. | 364/200 |

OTHER PUBLICATIONS

Sun Microsystems, Inc., "Sun—3 Architecture", Aug. 1986, pp. 8–9, 49–57.
USENIX; Mach: A New Kernel Foundation for UNIX Development, 1986, pp. 93–112.
Bloom, James M., Dunlap, Kevin J., "Experiences Implementing BIND, A Distributed Name Server for the DARPA Internet", pp. 172–181.
Rifkin et al., "RFS Architectural Overview", pp. 248–259.
Kleiman, S. R., "Vnodes: An Architecture for Multiple File System Types in Sun UNIX", pp. 238–247.
Gould, Ed, "The Network File System Implemented on 4.3 BSD", pp. 294–298.
Atlas, Alan; Finn, Perry, "Error Recovery in a Stateful Remote Filesystem", pp. 355–365.

Primary Examiner—Gareth D. Shaw
Assistant Examiner—Deborah Chun
Attorney, Agent, or Firm—Marilyn D. Smith

[57] ABSTRACT

A distrbuted services program installed on each of a plurality of data processing systems in a network allows the processors to access data files distrbuted across the various nodes of the network.

To reduce the network traffic overhead when files at other nodes are accessed, and to preserve the file system semantics, i.e. the file integrity, the accessing of the various files are managed by file synchronization modes. A file is given a first synchronization mode if a file is open at only one node for either read or write access. A file is given a second synchronization mode if a file is opened for read only access at any node. A file is given a third synchronization mode if the file is open for read access in more than one node, and at least one node has the file open for write access.

If a file is in either the first or second synchronization mode, the client node, which is the node accessing the file, uses a client cache within its operating system store the file. All read and writes are then sent to this cache.

If a file is in the third mode, all read and write requests must go to the server node where the file resides. The node accessing the file does not use the cache in its operating system to access the file data during this third mode.

21 Claims, 21 Drawing Sheets

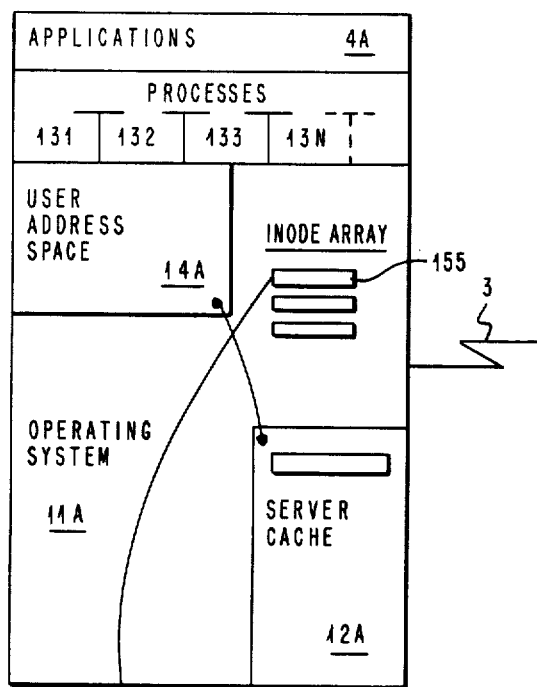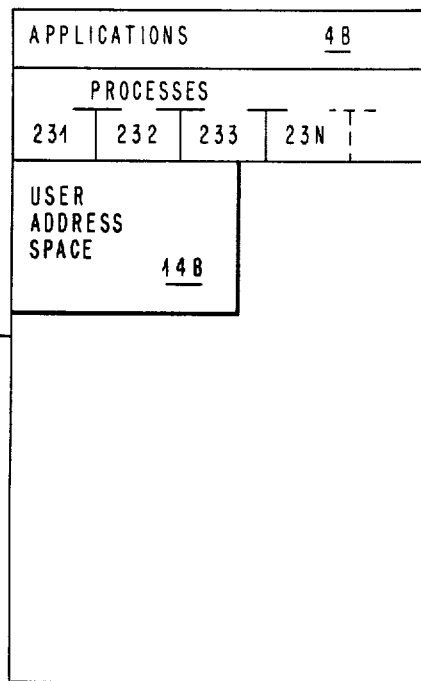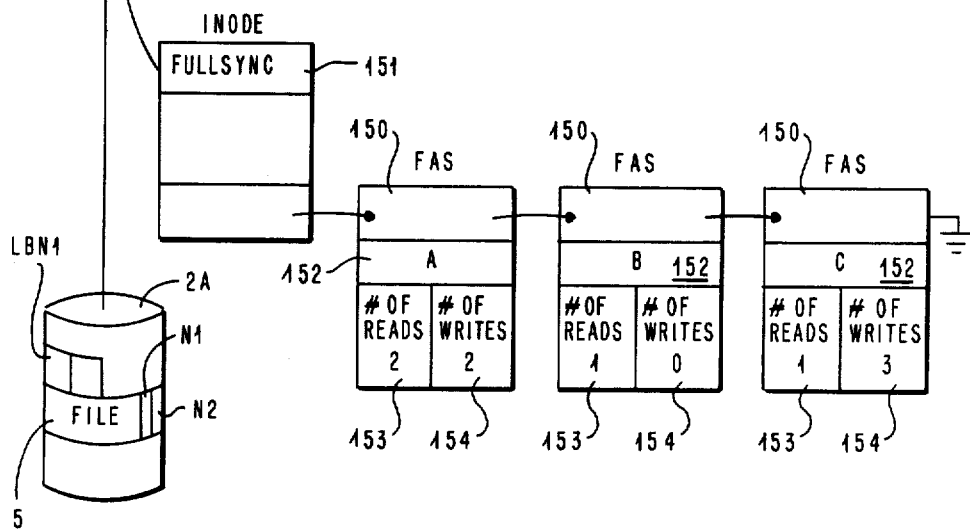
FIG. 8

VFS

VNODE

INODE

FILE ACCESS STRUCTURE

NODE TABLE ENTRY

SURROGATE INODE

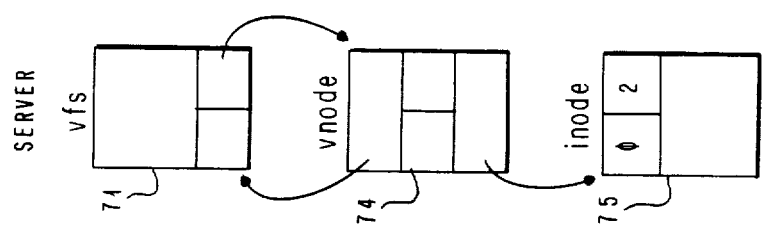
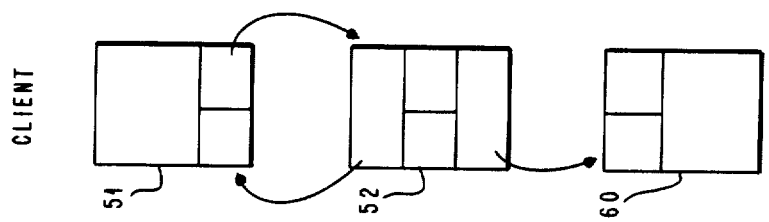
FIG. 16

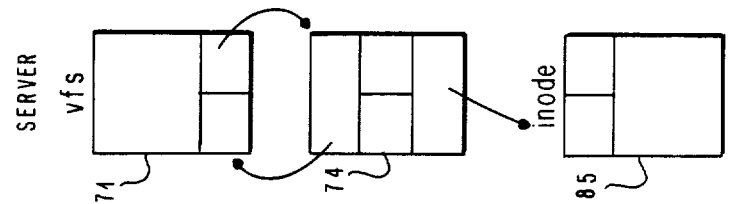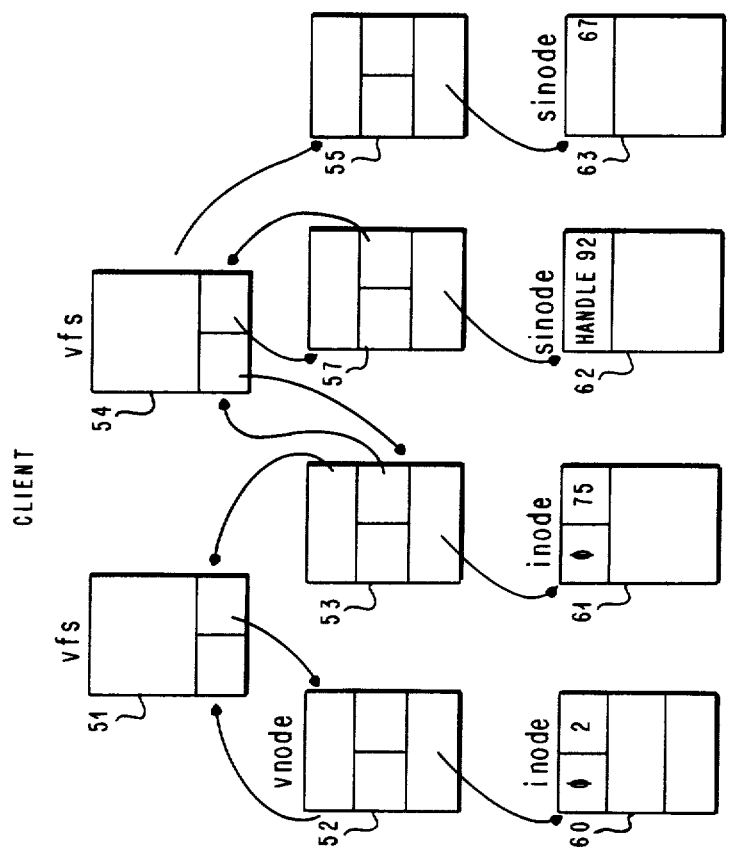
FIG. 48

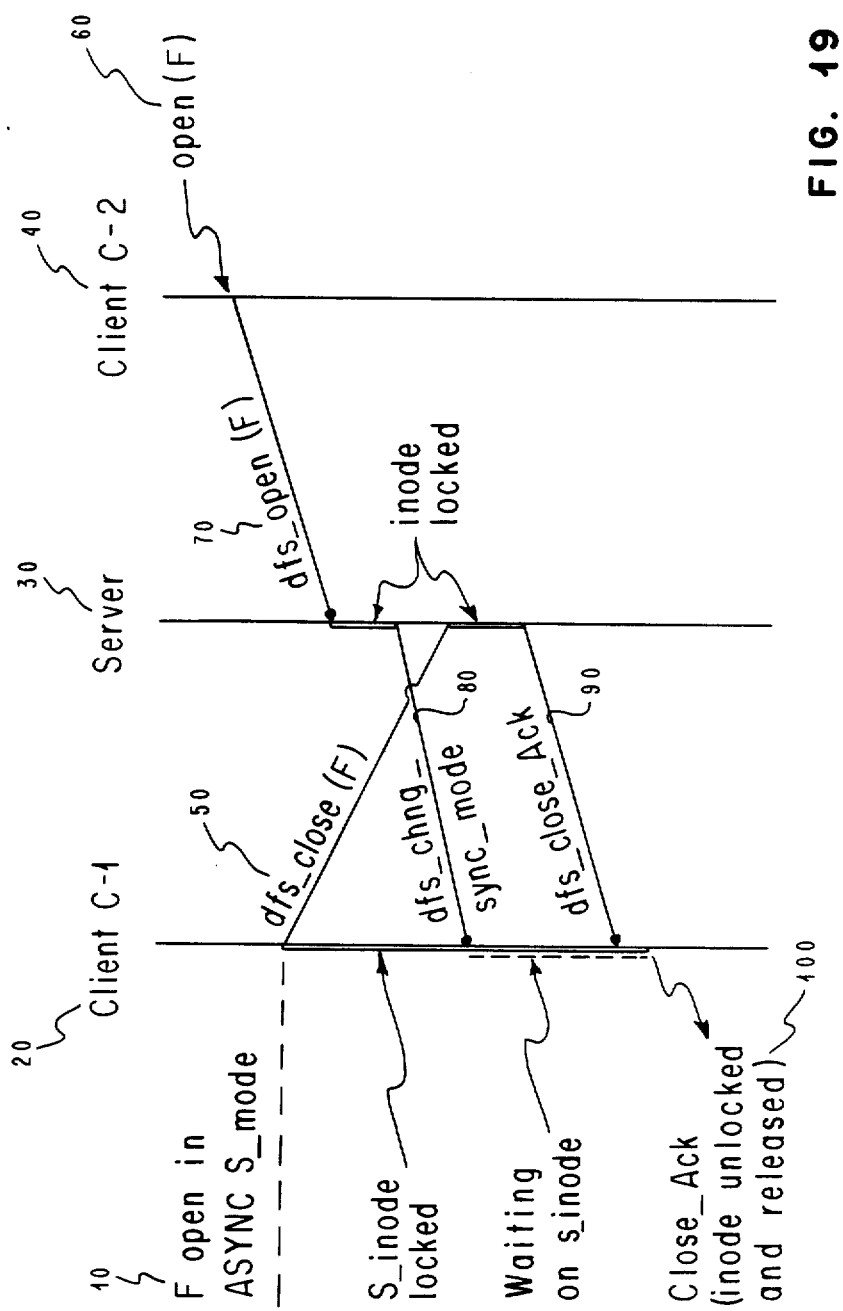

SYSTEM AND METHOD FOR ACCESSING REMOTE FILES IN A DISTRIBUTED NETWORKING ENVIRONMENT

CROSS REFERENCE TO RELATED APPLICATIONS

This application is related in subject matter to the following applications filed concurrently herewith and assigned to a common assignee:

Application Ser. No. 07/014,899 filed by A. Chang, G. H. Neuman, A. A. Shaheen-Gouda, and T. A. Smith for A System And Method For Using Cached Data At A Local Node After Re-opening A File At A Remote Node In A Distributed Networking Environment.

Application Ser. No. 07/014,884 filed by D. W. Johnson, L. W. Henson, A. A. Shaheen-Gouda, and T. A. Smith for Negotiating Communicating Conventions Between Nodes In A Network.

Application Ser. No. 07/014,900 filed by D. W. Johnson, A. A. Shaheen-Gouda, T. A. Smith for Distributed File Access Structure Lock.

Application Ser. No. 07/014/891 filed by L. W. Henson, A. A. Shaheen-Gouda, and T. A. Smith for File and Record Locking Between Nodes in a Distributed Data Processing Environment.

Application Ser. No. 07/014,892 filed by D. W. Johnson, L. K. Loucks, C H. Sauer, and T. A. Smith for Single System Image Uniquely Defining An Environment for Each User In A Data Processing System.

Application Ser. No. 07/014,888 filed by D. W. Johnson, L. K. Loucks, A. A. Shaheen-Gouda for Interprocess Communication Queue Location Transparency.

Application Ser. No. 07/014,889 filed by D. W. Johnson, A. A. Shaheen-Gouda, and T. A. Smith for Directory Cache Management In a Distributed Data Processing System.

The disclosures of the foregoing co-pending applications are incorporated herein by reference.

DESCRIPTION

1. Field of the Invention

This invention relates to processing systems connected through a network, and more particularly to the accessing of files between local and remote processing systems within the network.

2. Background Art

As shown in FIG. 1, a distributed networking environment 1 consists of two or more nodes A, B, C, connected through a communication link or a network 3. The network 3 can be either a local area network (LAN), or a wide area network (WAN). The latter consists of switched or leased teleprocessing (TP) connections to other nodes, or to a systems network architecture (SNA) network of systems.

At any of the nodes A, B, C, there may be a processing system 10A, 10B, 10C, such as a personal computer. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C.

The problems encountered in accessing remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a personal computer, and the user address space 14. The local buffer 12 in the operating system 11 is also referred to as a local cache or kernel buffer.

In the standalone system, the kernel buffer 12 is identified by blocks 15 which are designated as device number, and logical block number within the device. When a read system call 16 is issued, it is issued with a file descriptor of the file 5, and a byte range within the file 5, as shown in step 101, FIG. 3. The operating system 11 takes this information and converts it to device number, and logical block numbers in the device, step 102, FIG. 3. Then the operating system 11 reads the cache 12 according to the device number and logical block numbers, step 103.

Any data read from the disk 2 is kept in the cache block 15 until the cache block 15 is needed. Consequently, any successive read requests from an application 4 that is running on the processing system 10 for the same data previously read is accessed from the cache 12 and not the disk 2. Reading from the cache is less time consuming than going out to the fixed disk 2, accessing the correct disk sectors, and reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX[1] (Advanced Interactive Executive) operating system improves the overall performance of the system since disk accessing is eliminated for successive reads and writes. Overall performance is enhanced because accessing permanent storage is slower and more expensive than accessing a cache.

[1] AIX is a trademark of IBM Corporation.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block N1 at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated file that has just been written. As such, the file integrity is lost since a node may be accessing incorrect and outdated files.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

The invention to be described hereinafter was implemented in a version of the UNIX[2] operating system but may be used in other operating systems having characteristics similar to the UNIX operating system. The UNIX operating system was developed by Bell Telephone Laboratories, Inc., for use on a Digital Equipment Corporation (DEC) minicomputer but has become a popular operating system for a wide range of minicomputers and, more recently, microcomputers. One reason for this popularity is that the UNIX operating system is written in the C programming language, also developed at Bell Telephone Laboratories, rather than in assembly language so that it is not processor specific. Thus, compilers written for various machines to give them C capability make it possible to transport the UNIX operating system from one machine to another. Therefore, application programs written for the UNIX operating system environment are also portable from one machine to another. For more information on the UNIX operating system, the reader is referred to *UNIX TM System, User's Manual, System V*, published by Western Electric Co., January 1983. A good overview of the UNIX operating system is provided by Brian W. Kernighan and Rob Pike in their book entitled *The Unix Programming Environment*, published by Prentice-Hall (1984). A more detailed description of the design of the UNIX operating system is to be found in a book by Maurice J. Bach, *Design of the Unix Operating System*, published by Prentice-Hall (1986).
[2]Developed and licensed by AT&T. UNIX is a registered trademark of AT&T in the U.S.A. and other countries.

AT&T Bell Labs has licensed a number of parties to use the UNIX operating system, and there are now several versions available. The most current version from AT&T is version 5.2. Another version known as the Berkeley version of the UNIX operating system was developed by the University of California at Berkeley. Microsoft, the publisher of the popular MS-DOS and PC-DOS operating systems for personal computers, has a version known under their trademark as XENIX. With the announcement of the IBM RT PC[3] (RISC (reduced instruction set computer) Technology Personal Computer)) in 1985, IBM Corp. released a new operating system called AIX which is compatible at the application interface level with AT&T's UNIX operating system, version 5.2, and includes extensions to the UNIX operating system, version 5.2. For more description of the AIX operating system, the reader is referred to *AIX Operating System Technical Reference*, published by IBM Corp., First Edition (Nov. 1985).
[3]RT and RT PC are trademarks of IBM Corporation.

The invention is specifically concerned with distributed data processing systems characterized by a plurality of processors interconnected in a network. As actually implemented, the invention runs on a plurality of IBM RT PCs interconnected by IBM's Systems Network Architecture (SNA), and more specifically SNA LU 6.2 Advanced Program to Program Communication (APPC). *An Introduction To Advanced Program-To-Program Communication (APPC)*, Technical Bulletin by IBM International Systems Centers, July 1983, number GG24-1584-0, and *IBM RT PC SNA Access Method Guide and Reference*, Aug. 15, 1986, are two documents that further describe SNA LU 6.2.

SNA uses as its link level Ethernet[4] a local area network (LAN) developed by Xerox Corp., or SDLC (Synchronous Data Link Control). A simplified description of local area networks including the Ethernet local area network may be found in a book by Larry E. Jordan and Bruce Churchill entitled *Communications and Networking for the IBM PC*, published by Robert J. Brady (a Prentice-Hall company) (1983). A more definitive description of communications systems for computers, particularly of SNA and SDLC, is to be found in a book by R. J. Cypser entitled *Communications Architecture for Distributed Systems*, published by Addison-Wesley (1978). It will, however, be understood that the invention may be implemented using other and different computers than the IBM RT PC interconnected by other networks than the Ethernet local area network or IBM's SNA.
[4]Ethernet is a trademark of Xerox Corporation.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system in a UNIX operating system environment are known. For example, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network File System", *Conference Proceedings, Usenix 1985*, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless machine. More specifically, the server in a distributed system may be designed to be stateless. This means that the server does not store any information about client nodes, including such information as which client nodes have a server file open, whether client processes have a file open in read_only or read_ write modes, or whether a client has locks placed on byte ranges of the file. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "statefull implementation". A "statefull" server, such as that described here, does keep information about who is using its files and how the files are being used. This requires that the server have some way to detect the loss of contact with a client so that accumulated state information about that client can be discarded. The cache management strategies described here, however, cannot be implemented unless the server keeps such state information. The management of the cache is affected, as described below, by the number of client nodes which have issued requests to open a server file and the read/write modes of those opens.

SUMMARY OF THE INVENTION

It is therefore an object of this invention to improve the response time in accessing remote files.

It is a further object of this invention to maintain the file integrity in a distributed networking environment.

The system and method of this invention takes into account three different situations when processing systems are reading and writing to files in a distributed networking environment. In the first situation, all reading and writing to a file is performed at a single client node. In the second situation, all nodes only read from a file. In the third situation, more than one node is performing a read from a file, and at least one node is writing to the file. The third situation may also be brought about if the device is open for a write at the server.

In the first two situations, a local client cache exists in every node. The client processes executing at the client nodes access the server file via two step caching: the client cache and the server cache. Using the client cache efficiently to access a remote file can significantly improve the performance since it can save network traffic and overhead.

In the third situation, client caching is not used since file integrity is deemed more important than performance speed. In a distributed networking environment, the first two situations occur more frequently than the third situation. Consequently, by providing for these three separate situations, overall performance is optimized without sacrificing file integrity.

BRIEF DESCRIPTION OF THE DRAWING

FIG. 8 shows a client accessing a file at the server in FULLSYNC s_mode.

FIGS. 11 and 12 are block diagrams of the data structures illustrating the before and after conditions of the scenario for a mount file operation at a local node as performed by the operating system.

FIGS. 16, 17 and 18 are block diagrams of the data structures illustrating the scenarios for a mount file operation and following a path to a file at a local and remote node in a distributed system as performed by the operating system.

FIG. 19 is a diagram showing the control flow of accesses to a file by two client nodes.

DESCRIPTION OF THE PREFERRED EMBODIMENT

Figure 4:
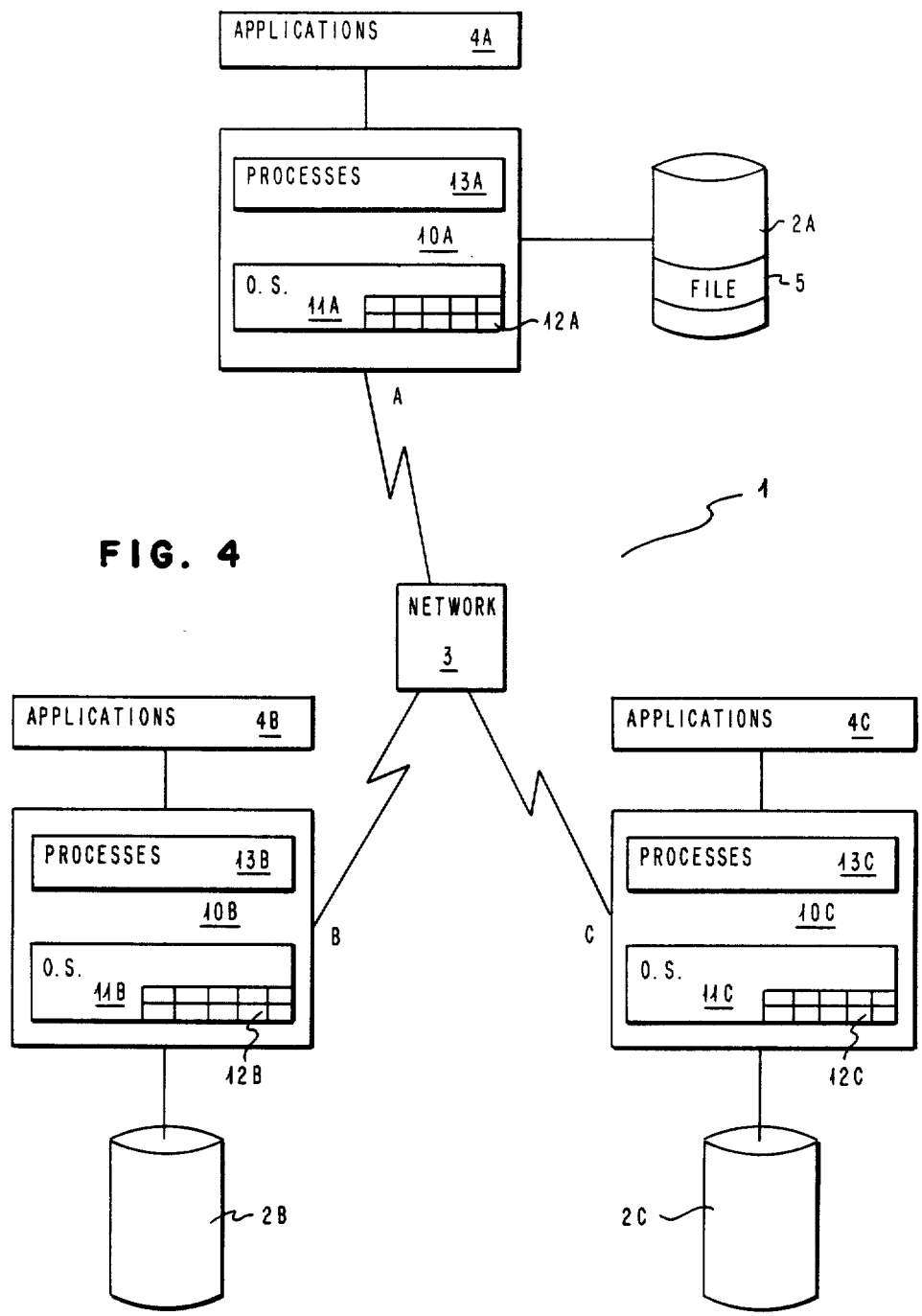
FIG. 4 shows three distributed processing systems connected in a network for accessing files across the network with client and server caches.

In the present invention as shown in FIG. 4, a local cache 12A, 12B, 12C, exists at every node A, B, C. If file 5 permanently resides at node A on disk 2A, node A is referred to as the server. At the server A, use of the cache 12A by local processes 13A executing at the server node A is as that in a stand-alone system as discussed above in the Background Art.

Figure 5:
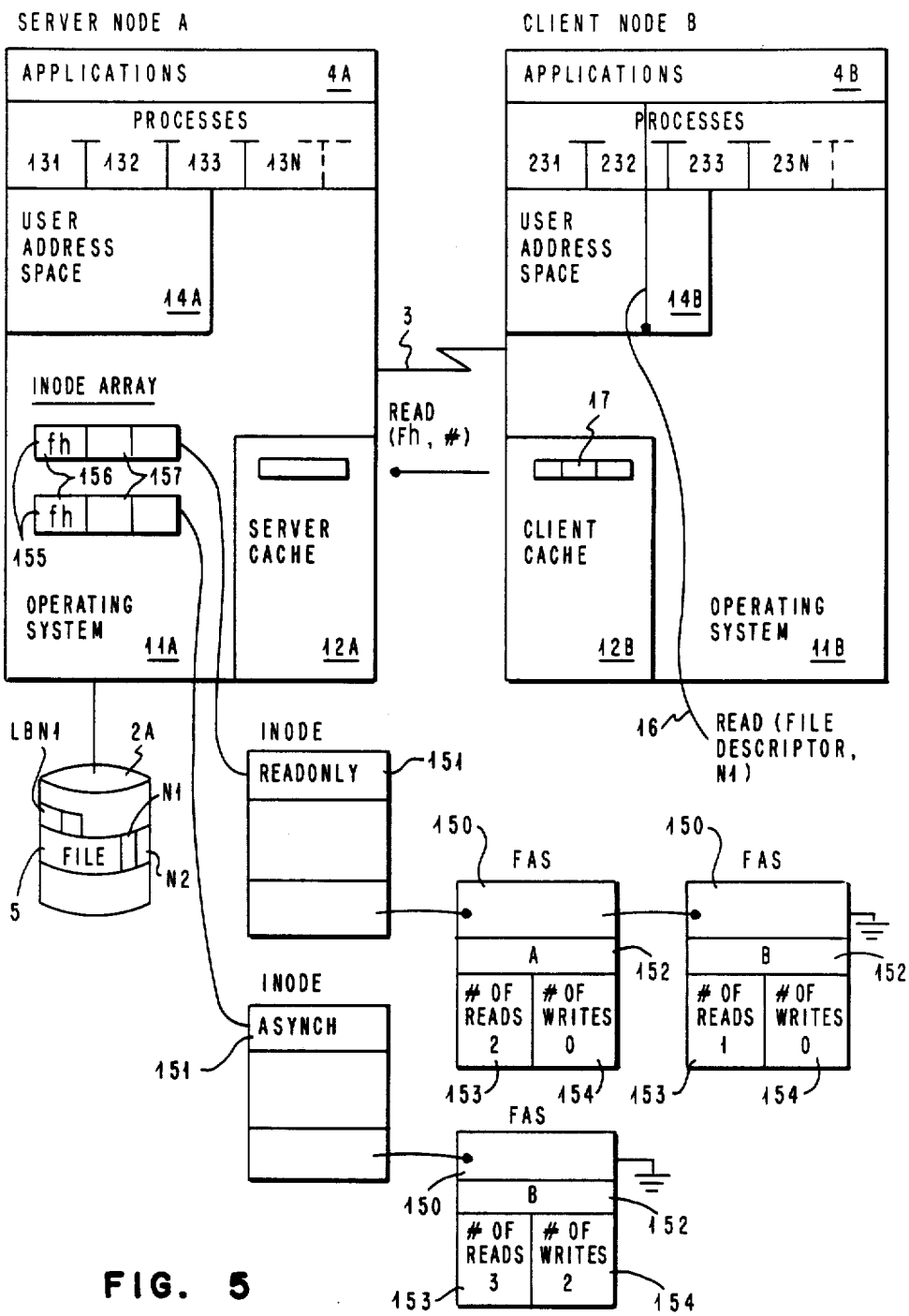
FIG. 5 shows a client and server node having client and server caches, respectively in READONLY or ASYNC synchronization mode.

However, remote processes 13B, 13C executing at nodes B, C, access the file 5 through a two step caching scheme using a server cache and a client cache as shown more clearly in FIG. 5. The server node A gets blocks of file 5 from disk 2A and stores it in the server cache 12A. Client node B goes out over the network 3 and gets blocks of file 5 from the server cache 12A. Client node B stores the blocks of file 5 as it existed in the server cache 12A into the client cache 12B. When the user address space 14B of client node B seeks data from any block of file 5, the client cache 12B is accessed instead of going across the network 3 for each access. Using the client cache 12B to access a remote file 5 can significantly improve the performance since it can save network traffic and overhead.

The system and method of this invention manages the use of the client cache 12B and server cache 12A in a distributed environment to achieve high performance while preserving the file access semantics at the application program level. This allows existing programs which run on a stand-alone system to run on a distributed system without any modification.

The file access semantics preserves a file's integrity as it is being opened by different processes that issue read and write system calls to access and modify the file. The file access semantics require that only one I/O operation is allowed on any byte range at a time, and once an I/O operation starts, it cannot be pre-empted by any other I/O operation to the same byte range of the file.

An example of this is given by referring again to FIG. 5. If process 131 issues a write system call to a byte range N1-N2 in file 5, the write system call can only be executed when the entire byte range N1-N2 is available for access by process 131, and no read operation involving the byte range N1-N2 is being executed. During the execution of the write system call, all other operations involving the byte range N1-N2 in file 5 are suspended until the write is completed. The write is not completed until the bytes are written to the local cache 12A. When a write request is complete, the written data in the cache 12A is visible to any subsequent read operation by any of the other processes 131-13N.

Another requirement of file access semantics is that when a file byte range such as N1-N2, which can be a record or a set of related records accessed by the same I/O operation, is visible to a reading process, the file byte range N1-N2 must always have a consistent set of data reflecting the last update to this range. This range is never available for access while a write operation is being executed. In this way the next read issued by a process will read the data just written and not the old outdated data.

In a distributed networking environment of this invention as shown in FIG. 5, the execution of read and write system calls from different application programs 4A, 4B, and processes 131-13N, 231-23N are synchronized such that the file access semantics as discussed above are preserved. The system and method of this invention guarantees synchronization by utilizing various cache synchronization (sync) modes. For a specific file 5, the I/O calls are synchronized by either the client B or the server A depending on the location of the processes 131-13N, 231-23N which have the file 5 open for access, and the sync mode.

Figure 6:
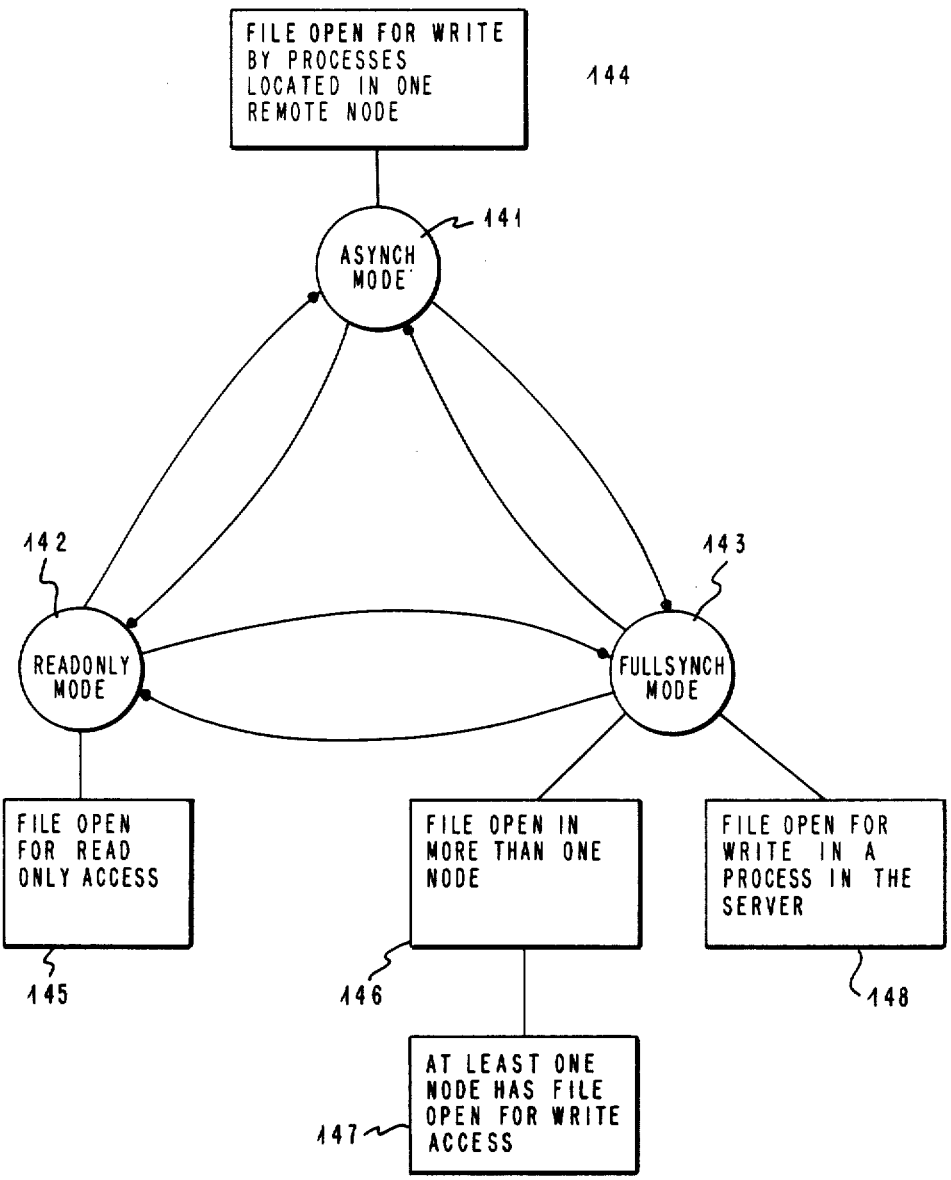
FIG. 6 shows the three synchronization modes used for managing the use of client and server caches in a distributed networking environment.

The three synchronization modes are shown in FIG. 6, and are described with reference to FIG. 4. The first mode 141 is referred to as ASYNCH s_mode, or asynchronous mode. The file 5 operates in this mode 141 if the file 5 is open for read/write access by processes 13C executing at only one client remote node C, as shown in block 144, FIG. 6. In this mode 141, all of the control is in the client node C. Both the server cache 12A and client cache 12C are used for these read/write operations. A read or write operation requires access to the server cache 12A only if it cannot be satisfied from the client cache 12C. Modified blocks at the client 12C are written to the server 12A by the periodic sync operation, or when the file 5 is closed by all processes 13C in the client node C, or when a block must be written in order to make room for other data being brought into the cache. Additionally modified blocks are written to the server when the file changes from ASYNC s_mode to FULLSYNC s_mode.

A second mode 142 is READONLY s_mode. The READONLY s_mode 142 is used for files 5 that are open for read only access from processes 13C in only one node C, or from processes 13B, 13C in more than one node B, C, as shown in block 145, FIG. 6. In this mode 142, the server cache 12A and the client caches 12B and/or 12C are used. The read request is issued for a block or more at a time. Every other read request from the same client, either B or C, to the specific block does not go to the server 12. Instead, it is read from the respective client cache, either B or C. In other words, a read operation does not require access to the server 12A if it can be satisfied from the client cache 12C or 12B. In summary, the file 5 operates in mode 142 if the file 5 is open for read only access by any of the processes 13A, 13B, 13C, in any of the nodes A, B, C.

A third mode 143 is FULLSYNCH s_mode. The FULLSYNC s_mode 143 is used for files 5 open in more than one node A, B, and at least one node has the file 5 open for write access. In the FULLSYNC s_mode 143, the client cache 12C or 12B is bypassed, and only the server cache 12A is used. All read and write operations are executed at the server 12A.

In a distributed environment 1 FIG. 4, most files 5 will more frequently be open for read only by processes 13A, 13B, 13C, at several nodes A, B, C in the READONLY s_mode 142, FIG. 6, or open for update at only one node in the Asynchronous s_mode 141, FIG. 6. It will be less frequent that there will be an open for read and write access by processes executing at more than one node in the Fullsync s_mode 143, FIG. 6. In both the READONLY s_mode 142, FIG. 6, and the ASYNCH s_mode 141, FIG. 6, the use of a client cache 12B, FIG. 5, significantly reduces the remote read/write response time of accessing file 5, and improves the overall system performance.

As shown in FIG. 8, in the FULLSYNC s_mode, the client cache is not used. The client node B accesses the file 5 from the server A over the network 3 for each read and write. Although the read/write response time increases in this mode, the file access semantics are preserved since a client does not retain a file 5 in a local cache that has not been updated along with the corresponding file residing at the server.

Utilizing the three modes to manage the use of the client cache optimizes overall system performance by combining both an overall average increase in read/write response speed with file integrity. Using a client cache in some situations decreases the read/write response time; while not using a client cache in other situations preserves the file system semantics.

A file's sync mode is not only dependent on which nodes have the file open, and whether the file is open for read or write, but also on whether the device where the file resides is open in raw access mode. Raw access for a device means that a block of data LBN1, FIG. 5, within a device 2A is accessed. In this way, the reads and writes of the device 2A read and write to a block LBN1 of device 2A. It is not relevant to which file the block belongs to. The device 2A can be open for raw access from a process 131-13N at the server node A. It cannot be open for raw access from a remote node B, C.

Figure 2:
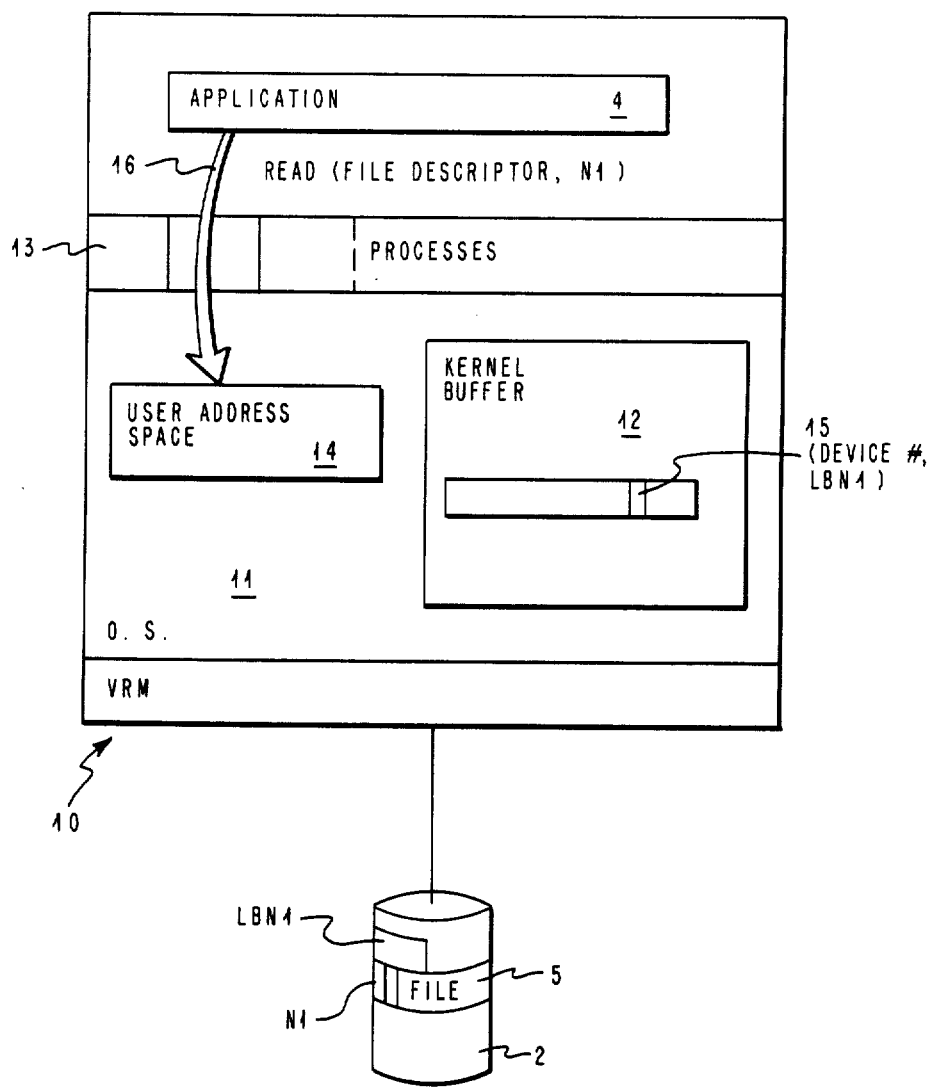
FIG. 2 shows a stand-alone processing system using a kernel buffer as known in the art.
Figure 3:
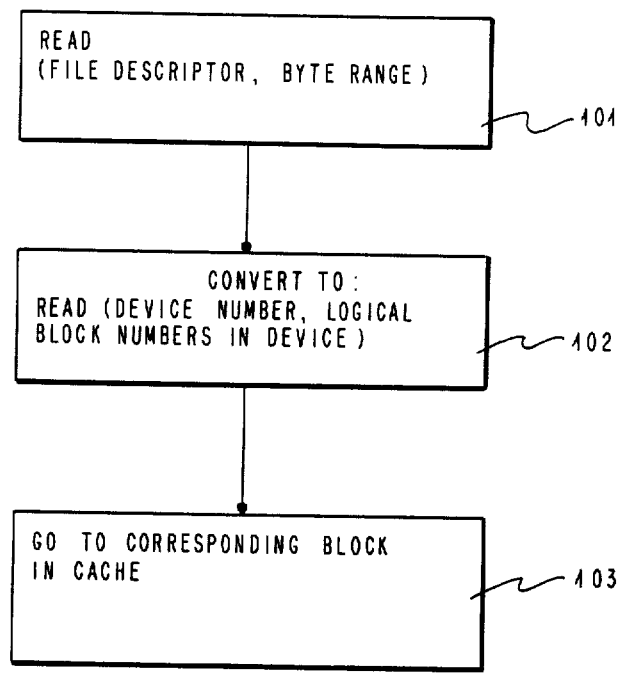
FIG. 3 shows a flow chart of a read to the kernel buffer in a stand-alone system as known in the art.

In reference to FIG. 5, the server cache 12A is managed as blocks LBN1 of a device 2A, similar to a stand-alone system as described above with reference to FIG. 2. The server A looks at the server cache 12A as a logical block LBN1 within a device 2A. The client B has no knowledge of where the file 5 resides on the device 2A. All that client B knows is that it accesses a file 5 on block number N1 on device 2A. The client cache 12B handles the data as logical blocks N1 of files 5. In the server cache 12A, the data is handled as logical blocks LBN1 of devices 2A. In handling the data this way, the server can guarantee that if data is written to the device as a raw device, and if there is another read of a block of the file that happens to be the same block that was written to the device, then the read would see the newly written data. This preserves the file system semantics.

Figure 9:
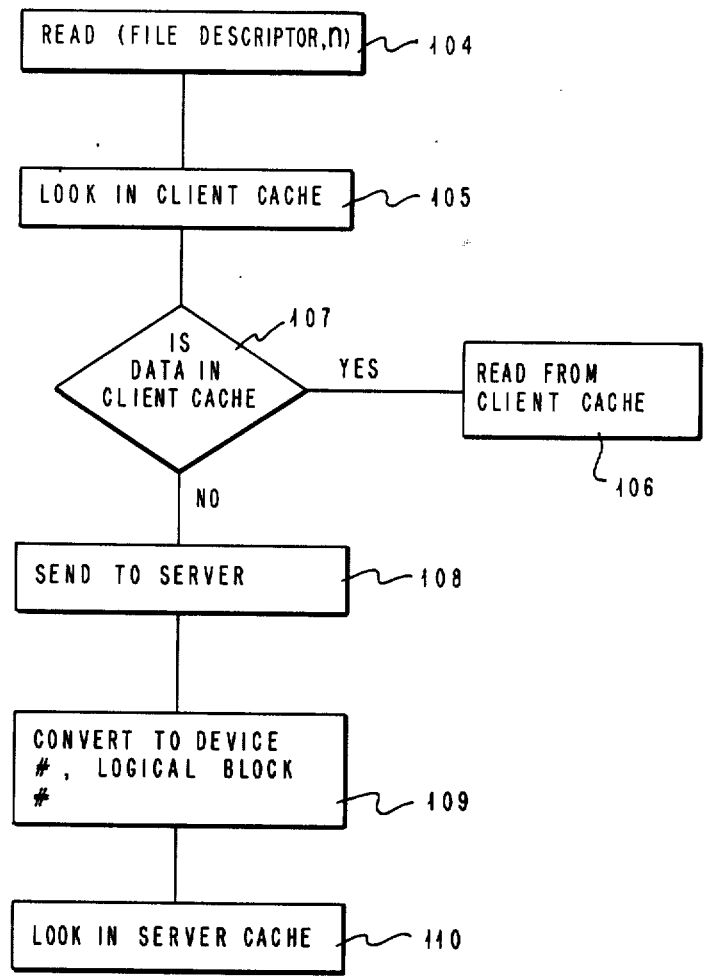
FIG. 9 shows the steps during a read when a client cache is used, and when the client cache is not used.

If the file is being accessed in a client node B, and the file is in ASYNC or READONLY mode, as shown in FIG. 5, the client operating system 11B does not convert the file descriptor and byte range within the file in the system call READ (file descriptor, N1) 16 to the device number and the logical block number in the device. The client does convert the file descriptor and byte range to a file handle, node identifier, and logical block number within the file. In the client cache 12B, there are blocks 17 that are designated by file handle, node identifier, and logical block number within the file. When a read 16 is issued from a client application 4B, step 104, FIG. 9, the request for the read goes to the operating system 11B with the file descriptor and the byte range within the file. The operating system then looks in the client cache 12B, step 105, FIG. 9. If the file handle, node identifier, and logical block number within the file is there, the cache 12B is read, step 106, FIG. 9. If it isn't there, step 107, FIG. 9, the read is sent to the server, step 108, FIG. 9. The server then takes the file handle and the logical block number within the file and converts it to a device number and logical block in the device, step 109, FIG. 9. This conversion is necessary since the server cache 12A is managed by device number and block number within the device as it is in a stand-alone system. After the read is sent to the server, it is handled the same as if the read was coming from its own application in a stand-alone system as described above with reference to FIG. 2.

Figure 7:
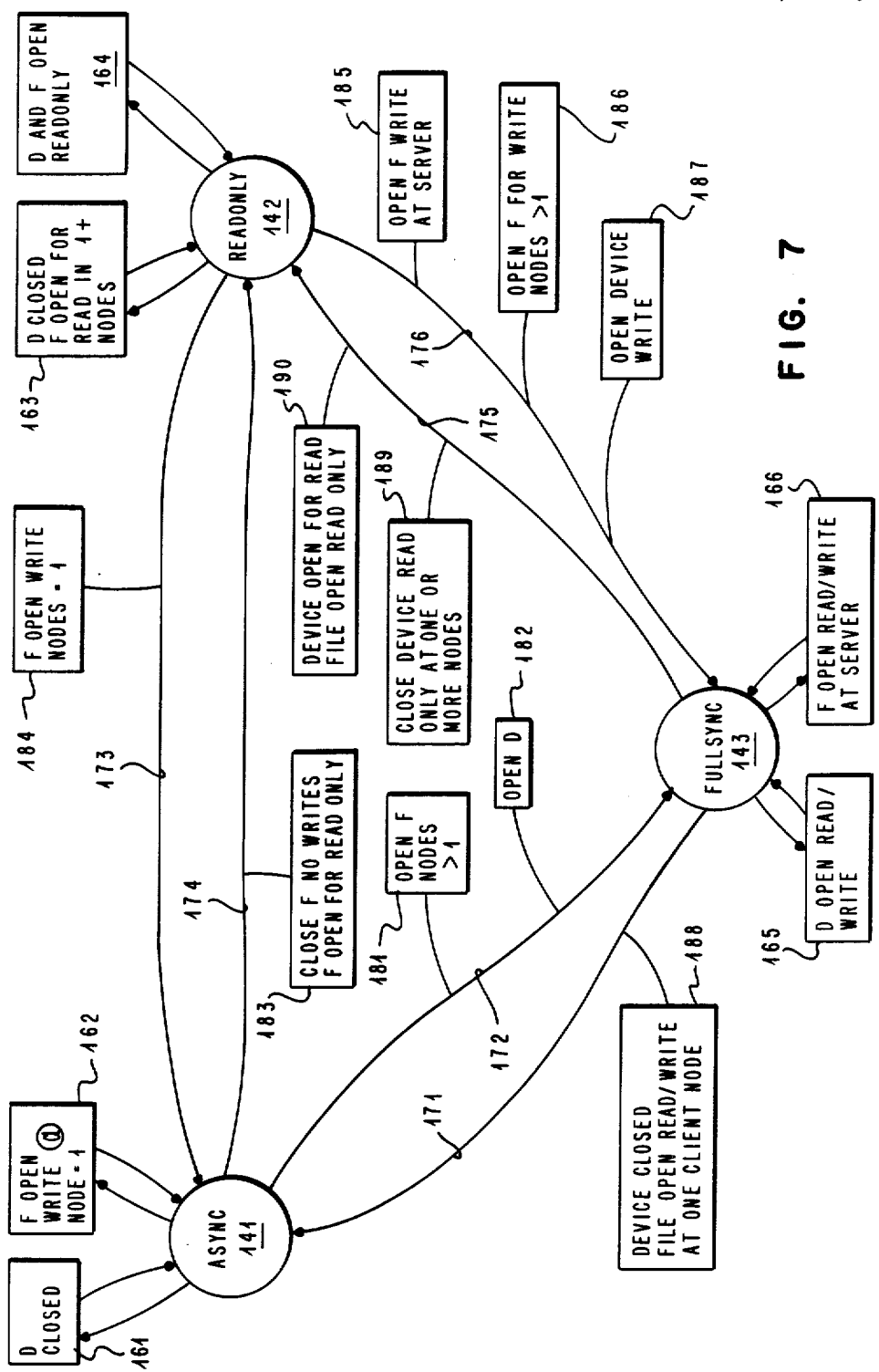
FIG. 7 shows the transitions between the three synchronization modes.

A closed file does not have a synchronization mode. However, once a file is first opened by a process, the file's sync mode is initialized according to the following as illustrated in FIG. 7.

The sync mode for a file is initialized to ASYNCH 141 if the device (D) where the file resides is closed 161, i.e., it is not open as a special device, and the file is open for write access at one remote node 162.

The sync mode for a file is READONLY 142 if the device where the file resides is closed, and the file is open for read only access in one or more nodes 163, or both the device and the file are open for read only access 164.

The sync mode for a file is initialized to FULLSYNCH 143 if the device where the file resides is open as a block special device for read/write access 65, or the file is opened in more than one node and at least one of the opens is for writing. A block special device means that there is a raw access to the device.

Once a file is initialized to a mode, if the conditions change, the file mode may change. Transitions from one mode to another, as shown by lines 171-176 in FIG. 7, may occur under the following conditions.

If a file is presently in ASYNC mode 141, and the number of node where the file is open becomes two or more, 181, then the sync mode changes to FULLSYNC 143 as shown via line 172, FIG. 6. Also, if there is an open of the block special device D where the file resides, 182, the sync mode will change from ASYNC 141 to FULLSYNC 143. In a close operation for the file, if the close operation is not the last close of the file, and the file is still open for write, there is no mode change. However, if the close operation is the last close of the file for write access such that all the remaining opens are for read access, 183, then the new mode becomes READONLY 142 as shown via line 74. If the close operation is the last close of the file, then there is no sync mode.

If a file is presently in READONLY s_mode 142 and there is a file open operation, there will not be a mode change if the open is for read. However, if the open is for write, then the new sync mode is ASYNC 141 if all the opens are in one client node, 184 as shown via line 173. Otherwise, the sync mode is FULLSYNC Furthermore, if the device where the file resides is open for read/write access, 187, the new sync mode for the file is FULLSYNC mode 143. For a close operation, if the close is the last close of the file, there is no sync mode for the file. If the file is still open at one or more nodes after a close operation, there is no change to the sync mode.

If a file is presently in FULLSYNC mode 143 and there is another open for the file, or the device where the file resides is opened, there is no sync mode change. If after a close operation of the file, there remains an open for read/write access at one remote node, and the block special device where the file resides is not open, the sync mode is changed to ASYNC s_mode 141, as shown by block 188 via line 171. The sync mode is changed from FULLSYNC 143 to READONLY 142 if the block special device where the file resides is not open, and the file is open for read only access at one or more nodes as shown by block 189 on line 175, or if the block special device where the file resides is open for read only access and the file is open for read only access as shown in block 190 on line 175.

All open and close operations for files and devices are resolved at the server node. The server determines the sync mode of an open file when executing any operation that may change the mode. The server also performs the change of the synchronization modes. As the server gets new opens or closes for the file, a change in synchronization modes for the file may be triggered. If the required sync mode is not the current one, the server sends a "change sync mode" remote procedure call (rpc) to all the clients with the file open.

After a file is opened for the first time, the client that opened the file is informed of the mode of the file. If the mode is either ASYNC or READONLY, the client can start using the client cache for reads, and also for writes if the mode is ASYNC, as shown in FIG. 5. The client does not have to read or write over the communications link to the server. If the mode is FULLSYNC as shown in FIG. 8, the client cache is not used, and the client must send the read or write over the communications link 3 to the server.

The server A, FIG. 5, always sets the mode 151 of the file 5. The mode of the file is the same at every node that has the file open. The server A also knows which nodes have the file open, and whether the opens are for reads, or writes. The server A doesn't have to know which processes 131-13N, 231-23N within a node have a file open. The server keeps all the above information in a file access structure list 150. Each element of the file access structure list 150 contains a node which has the file open 152, the number of opens for read 153 in the node, and the number of opens for write 154 in the node.

If a file is in ASYNC mode, then only one client node has the file open, and the cache at this client may contain blocks which have been modified but which have not been written to the server. The client cache may also contain blocks which have been read from the server but which have not been modified. When a file changes sync mode from ASYNC to FULLSYNC, the server notifies the client of the change, and the client writes all of the file's modified blocks to the server and discards any unmodified blocks.

If the file is in READONLY sync mode, then many clients may have the file open, and the caches in each of these clients may contain blocks which have been read from the server. The client caches may not, however, contain any modified blocks. When a file changes sync mode from READONLY to FULLSYNC, the server notifies each client of the change. Each client then discards any of the file's blocks from its cache.

DESCRIPTION OF OPERATION

The preceding discussion provides an implementation independent of the discussion of file caching. The following discussion is a more detailed description of an implementation of the caching method. Caching only applies to files which have been opened, but in the implementation described, a remote file must first be made accessible by a "mount" operation before it can be opened. The mount operation constructs data structures which must be in place before the open can be performed. Therefore, the first part of the implementation discussion describes mounting and path following in some detail. This detail is not directly relevant to the caching discussion, but it is necessary ground work preparatory to a detailed discussion of managing the cache.

The following disclosure describes solutions to problems which are encountered when creating a distributed file system in which the logic that manages a machine's files is altered to allow files that physically reside in several different machines to appear to be part of the local machine's file system. The implementation described is an extension of the file system of the AIX ™ operating system. Reference should be made to the above-referenced Technical Reference for more information on this operating system. Specific knowledge of the following AIX ™ file system concepts is assumed: tree structured file systems; directories; and file system organization, including inodes.

The essential aspects of a file system that are relevant to this discussion are listed below:

(a) each file on an individual file system is uniquely identified by its inode number (b) directories are files, and thus a directory can be uniquely identified by its inode number.

Note: In some contexts it is necessary to distinguish between files which are directories and files which are not directories (e.g., files which simply contain ordinary data, or other files types supported by UNIX[5] derivative operating systems such as special files or pipes).

[5]Developed and licensed by AT&T. UNIX is a registered trademark of AT&T in the U.S.A. and other countries.

In this disclosure the term "simple file" is used to indicate such a non-directory file. Unless otherwise indicated the term "file" may mean either a directory file or a simple file, and, of course, the term "directory" means a directory file.

(c) a directory contains an array of entries of the following form:

name—inode number where the inode number may be that of a simple file or that of another directory.

Note: A directory may contain other directories, which, in turn, may contain other directories or simple files.

Thus a directory may be viewed as the root of a subtree which may include many levels of descendant directories, with the leaves of the tree being "simple files".

In this disclosure the term "descendants" means all of the files which exist in the file tree below a particular directory, even those which can be reached only by going through other directories. The "immediate descendants" of a directory are only those files (simple files or directories) whose names appear in the directory.

(d) by convention, the inode number of the file system's root directory is inode number 2.

The following discussion describes how traditional UNIX operating systems use mounts of entire file systems to create file trees, and how paths are followed in such a file tree.

Following the path "/dir1/dir2/file" within a device's file system thus involves the following steps:

1. Read the file identified by inode number 2 (the device's root directory).
2. Search the directory for an entry with name=dir1.
3. Read the file identified by the inode number associated with dir1 (this is the next directory in the path).
4. Search the directory for an entry with name=dir2.
5. Read the file identified by the inode number associated with dir2 (this is the next directory in the path).
6. Search the directory for an entry with name=file.
7. The inode number associated with file in this directory is the inode number of the simple file identified by the path "/dir1/dir2/file".

The file trees which reside on individual file systems are the building blocks from which a node's aggregate file tree is built. A particular device (e.g., hard file partition) is designated as the device which contains a node's root file system. The file tree which resides on another device can be added to the node's file tree by performing a mount operation. The two principal arameters to the mount operation are (1) the name of the device which holds the file tree to be mounted and (2) the path to the directory upon which the device's file tree is to be mounted. This directory must already be part of the node's file tree; i.e., it must be a directory in the root file system, or it must be a directory in a file system which has already been added (via a mount operation) to the node's file tree.

After the mount has been accomplished, paths which would ordinarily flow through the "mounted over" directory instead flow through the root inode of the mounted file system. A mount operation proceeds as follows:

1. Follow the path to the mount point and get the inode number and device number of the directory which is to be covered by the mounted device.
2. Create a data structure which contains essentially the following:
   (a) the device name and inode number of the covered directory; and
   (b) the device name of the mounted device.

The path following in the node's aggregate file tree consists of (a) following the path in a device file tree until encountering an inode which has been mounted over (or, of course, the end of the path); (b) once a mount point is encountered, using the mount data structure to determine which device is next in the path; and (c) begin following the path at inode 2 (the root inode) in the device indicated in the mount structure.

The mount data structures are volatile; they are not recorded on disk. The list of desired mounts must be re-issued each time the machine is powered up as part of the Initial Program Load (IPL). The preceding discussion describes how traditional UNIX operating systems use mounts of entire file systems to create file trees and how paths are followed in such a file tree. Such an implementation is restricted to mounting the entire file system which resides on a device. The virtual file system concept described herein and in the reference material allows (1) mounting a portion of the file system which resides on a device by allowing the mounting of files (directories or simple files) in addition to allowing mounting of devices, and (2) mounting either remote or local directories over directories which are already part of the file tree. The invention described herein is an enhancement to the virtual file system concept which further allows the mounting of simple files (remote or local) over simple files which are already part of the file tree.

In the virtual file system, the operations which are performed on a particular device file system are clearly separated from those operations which deal with constructing and using the node's aggregate file tree. A node's virtual file system allows access to both local and remote files.

The management of local files is a simpler problem than management of remote files. For this reason, the discussion of the virtual file system is broken into two parts. The first part describes only local operations. This part provides a base from which to discuss remote operations. The same data structures and operations are used for both remote and local operations. The discussion on local operations describes those aspects of the data and procedures which are relevant to stand-alone operations. The discussion on remote operations adds information pertinent to remote operations without, however, reiterating what was discussed in the local operations section.

Figure 10:
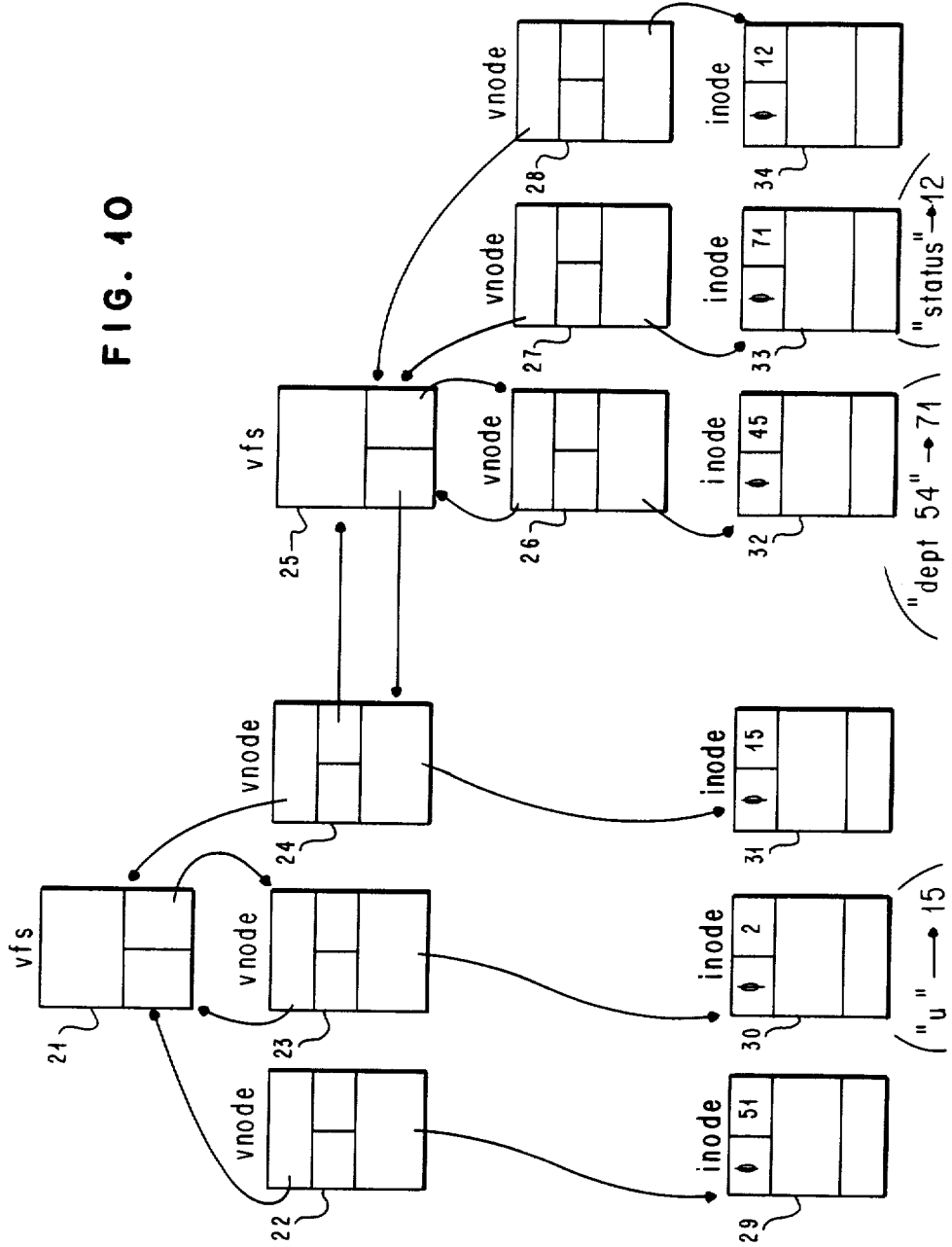
FIG. 10 is a block diagram of the data structure illustrating the scenario for following a path to a file operation at a local node as performed by the operating system which supports the subject invention.
Figure 42:
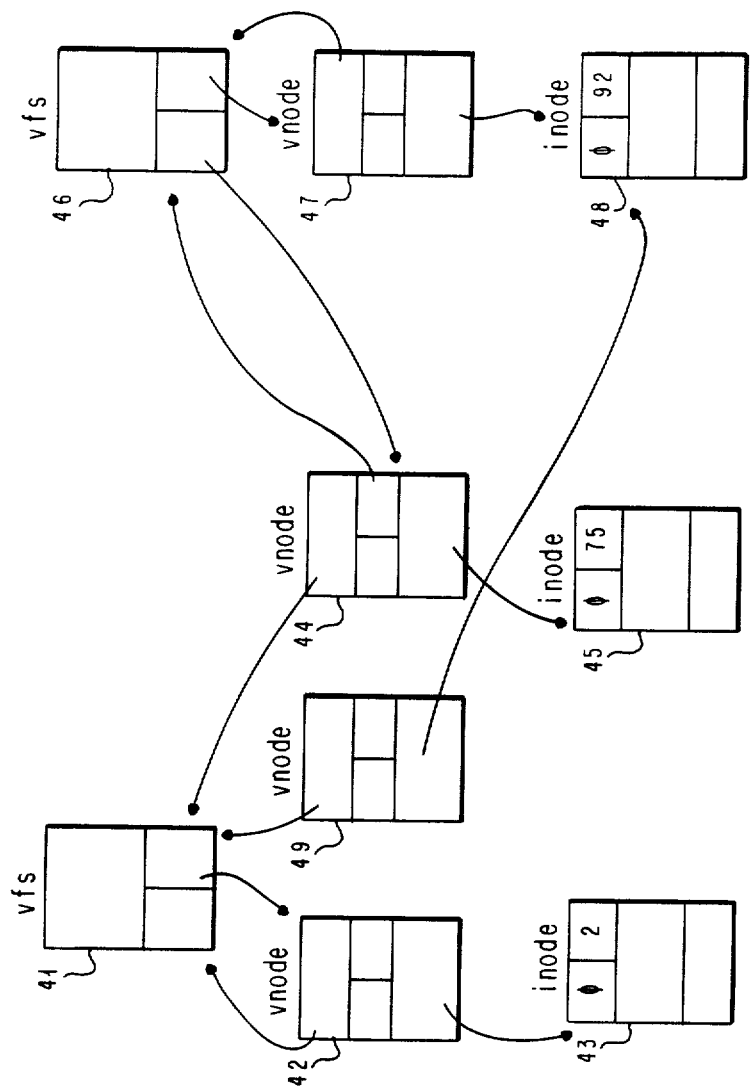
Figure 44:
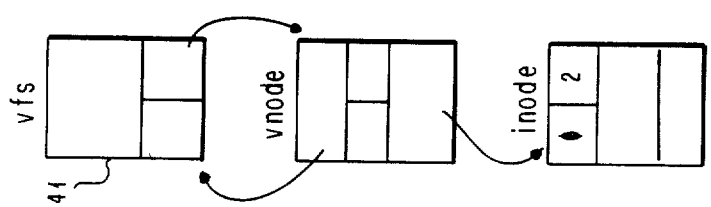
Figure 13A:
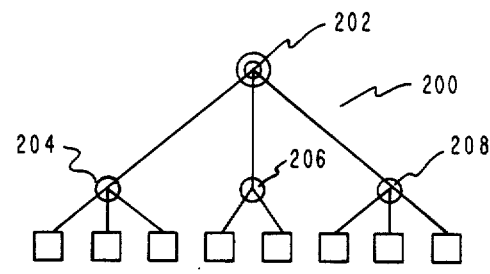
FIG. 13A shows a file tree whose immediate decendents are all directories.
Figure 13B:
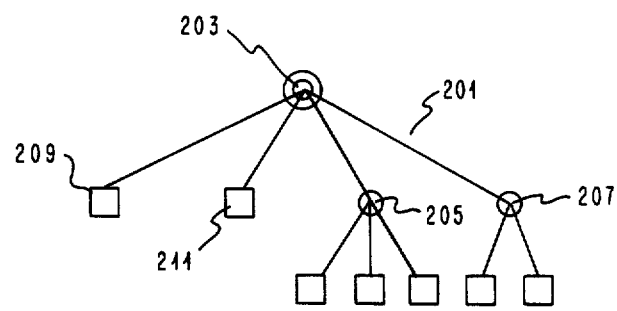
FIG. 13B shows a file tree whose immediate decendents are a collection of directories and simple files.
Figure 13C:
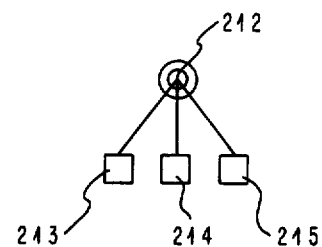
FIG. 13C shows a file tree whose immediate decendents are all simple files.

FIG. 10 shows the relationship that exists among the data structures of the virtual file system. Every mount operation creates a new virtual file system (vfs) data structure. The essential elements in this structure are (a) a pointer to the root vnode (virtual node) of this virtual file system (e.g., the arrow from block 21 to block 23), and (b) a pointer to the vnode which was mounted over when this virtual file system was created (e.g., the arrow from block 25 to block 24).

Whenever an inode needs to be represented in the file system independent portion of the system, it is represented by a vnode. The essential elements in this structure are the following:

(a) a pointer to the vfs which contains the vnode (e.g., the arrow from block 22 to block 21);

(b) a pointer to the vfs which is mounted over this vnode (e.g., the arrow from block 24 to block 25); but note however that not all vnodes are the mount point for a virtual file system, i.e., a null pointer indicates that this vnode is not a mount point;

(c) a pointer to either a surrogate inode or a real inode (e.g., the arrow from block 26 to block 32); and (d) a pointer to a node table entry (this is a non-null only when the file is a remote file).

The AIX operating system, in common with other UNIX operating systems, keeps a memory resident table which contains information about each inode that is being used by the system. For instance, when a file is opened, its inode is read from the disk and a subset of this inode information, together with some additional information, is stored in the inode table. The essential elements of an inode table entry are (a) a pointer to the head of a file access structure list and (b) information from the disk inode, the details of which are not relevant here.

The file access structure records information about which nodes have the file open, and about the modes (read only or read_write) of these opens. There is a separate file access structure for each node which has the file open. This state information enables the server to know how each client is using the server file.

The file system supports a set of operations which may be performed on it. A process interacts with a file system by performing a file system operation as follows:

1. The user calls one of the operations providing (perhaps) some input parameters.

2. The file system logic performs the operation, which may alter the internal data state of the file system.

3. The file system logic returns to the calling user, perhaps returning some return parameters.

The operations which can be performed on a file system are referred to as "vn_operations" or "vn_ops". There are several vn_ops, but the ones which are important to this discussion are described below:

VN_LOOKUP

In the vn_lookup operation, the essential iterative step in following a path in a file system is to locate the name of a path component in a directory and use the associated inode number to locate the next file in the chain. The pseudo code for the vn_lookup operation on a local file is listed below:

| function lookup |
|---|
| input: directory vnode pointer, |
| name to be looked up in directory |
| output: vnode pointer to named file/dir. |
| convert directory vnode pointer |
| to an inode pointer; |
| — use pointer in vnode |
| lock directory's inode; |
| if( we don't have search permission in |
| directory ) |
| unlock directory inode; |
| return error; |
| search directory for name; |
| if( found ) |
| create file handle for name; |
| —use inode found in directory entry; |
| get pointer to vnode for file handle; |
| unlock directory inode; |
| return pointer to vnode; |
| else— not found |
| unlock directory inode; |
| return error; |

LOOKUPPN

The lookuppn operation is the function which follows paths. Its input is a path (e.g., "/dir1/dir2/file"), and its return is a pointer to the vnode which represents the file. Lookuppn calls vn_lookup to read one directory, then it checks to see if the vnode returned by vn_lookup has been mounted over. If the vnode is not mounted over, then lookuppn calls vn_lookup in the same file system. If the vnode has been mounted over, then lookuppn follows the pointer from the mounted over vnode (e.g., block 24 in FIG. 10) to the vfs of the mounted file system (e.g., block 25 in FIG. 10). From the vfs, it follows the pointer to the root vnode (e.g., block 26 in FIG. 10) and, if the vnode is a directory and not a simple file, issues a new vn_lookup giving as input the vfs's root vnode and the name which constitutes the next element in the path. The pseudo code for the lookuppn function is listed below:

--- function lookuppn input: pathname
output: pointer to vnode for named file
if( first character of path is '/' )
current vnode for search is user's root directory vnode;
else
current vnode for search is user's current directory vnode;
repeat
if( next component of path is ".." )
while( current vnode is root of a virtual file system )
current vnode becomes the vnode that the virtual file system is mounted over;
if( there is not mounted over vnode )
return( error ); — ".." past root of file system
use vn_lookup to look up path component in current vnode;
if( vn_lookup found component );
current vnode becomes the vnode returned by vn_lookup;
while( current vnode is mounted over )
follow current vnode's pointer to vfs structure that represents the mounted virtual file system;
current vnode becomes root vnode of the mounted vfs;
else — vn_lookup couldn't file component
return( error ); — search failed
until( there are no additional path components );
return( current vnode );

---

The operation will be illustrated by describing the scenarios of following a path to a file and mounting a directory. First, in following a path to a file, suppose and application process issues a system call (e.g., open) for file "/u/dept54/status". This request is accomplished by the operating system in the following manner with reference to FIG. 10 (operations which are basically unchanged from the UNIX operating system are not explained here in any detail). The following assumptions are made: First, the vfs represented by block 21 is the root virtual file system. Second, the file "/u" is represented by vnode block 24 and inode block 31. Third, a previous mount operation has mounted a device's file system onto the directory "/u". This mount created the vfs represented by block 25. Fourth, all of the directories and files involved are on the same device. Fifth, the following directory entries exist in the indicated directories:

| DIRECTORY INODE NUMBER | NAME | INODE NUMBER |
|---|---|---|
| 2 | "u" | 15 |
| 45 | "dept54" | 71 |
| 71 | "status" | 12 |

The code which implements the system call calls lookuppn to follow the path. Lookuppn starts at the root vnode (block 23) of the root virtual file system (block 21) and calls vn_lookup to look up the name "u" in the directory file represented by this vnode. Vn_lookup finds in the directory that the name "u" is associated with inode 15 in block 31. Vn_lookup must return a pointer to a vnode associated with inode 15. To do this it first brings inode 15 into the inode table. Then it checks to see if there is already a vnode in the parent vfs (the input vnode (block 23) has a pointer to the parent vfs) for this vnode. In this case there is. Vn_lookup then finds the vnode (block 24) in the root vfs (block 21) and returns a pointer to the vnode. Lookuppn discovers that the returned vnode is mounted over in the parent vfs. It follows the "mounted over" pointer from the vnode (block 24) to the mounted vfs (block 25). Lookuppn follows the "root vnode" pointer to the root vnode (block 26) of the new vfs (block 25). Lookuppn now calls vn_lookup again, this time inputting a pointer to the root vnode (block 26) and name "dept54". As before, Vn—lookup reads the directory, finds the inode associated with the name, finds or creates a vnode for this inode in the parent vfs (block 25) and returns a pointer to this vnode. Lookuppn calls vn_lookup once more inputting the vnode for the just found directory and the name "status". Vn_lookup reads the directory, finds the inode associated with the name (block 34), finds or creates a vnode (block 28) for this inode in the parent vfs (block 25) and returns a pointer to this vnode. The code which implements the system call now performs the requested operation on the file.

Suppose now that an application process issues a "mount" system call to mount the file "/u/gorp" over the directory "/u/foo". The following scenario explains how this request is accomplished by the operating system (again, operations which are basically unchanged from the UNIX operating system are not explained in any detail).

This scenario refers to FIG. 11, which represents initial conditions, and FIG. 12, which represents the final conditions, with the following assumptions: First, the vfs represented by block 41 is the root virtual file system. Second, all of the directories and files involved are on the same device. Third, the following directory entries exist in the indicated directories:

| DIRECTORY INODE NUMBER | NAME | INODE NUMBER |
|---|---|---|
| 2 | "u" | 15 |
| 2 | "etc" | 83 |
| 15 | "gorp" | 92 |
| 83 | "foo" | 75 |
| 75 | "file1" | 89 |

The code which implements the mount system call performs the following operations. Lookuppn is called to follow the path to the file which is to be mounted over—"/etc/foo". At the completion of this operation, the root vfs (block 41) contains a vnode for "/etc/foo" (block 44) which has a pointer to the root vfs (block 41) and pointer to an inode table entry (block 45) for inode 75. Lookuppn is called to follow a path to the file which is to be mounted—"/etc/gorp". At the completion of this operation, the root vfs (block 41) contains a vnode for "/etc/gorp" (block 49) which has a pointer to the root vfs (block 41) and a pointer to an inode table entry (block 48) for inode 92. Now the mount logic creates the new virtual file system by first creating a new vfs (block 46) and then creating a root vnode for this vfs (block 47) with a pointer back to its parent vfs (block 46) and a pointer to the root inode (inode 92, block 48) of the vfs. A "mounted over" pointer is installed in the covered vnode (block 44) in the root vfs (block 41), and a pointer to the vnode upon which it is mounted (block 44) is installed in the new vfs.

Figure 1:
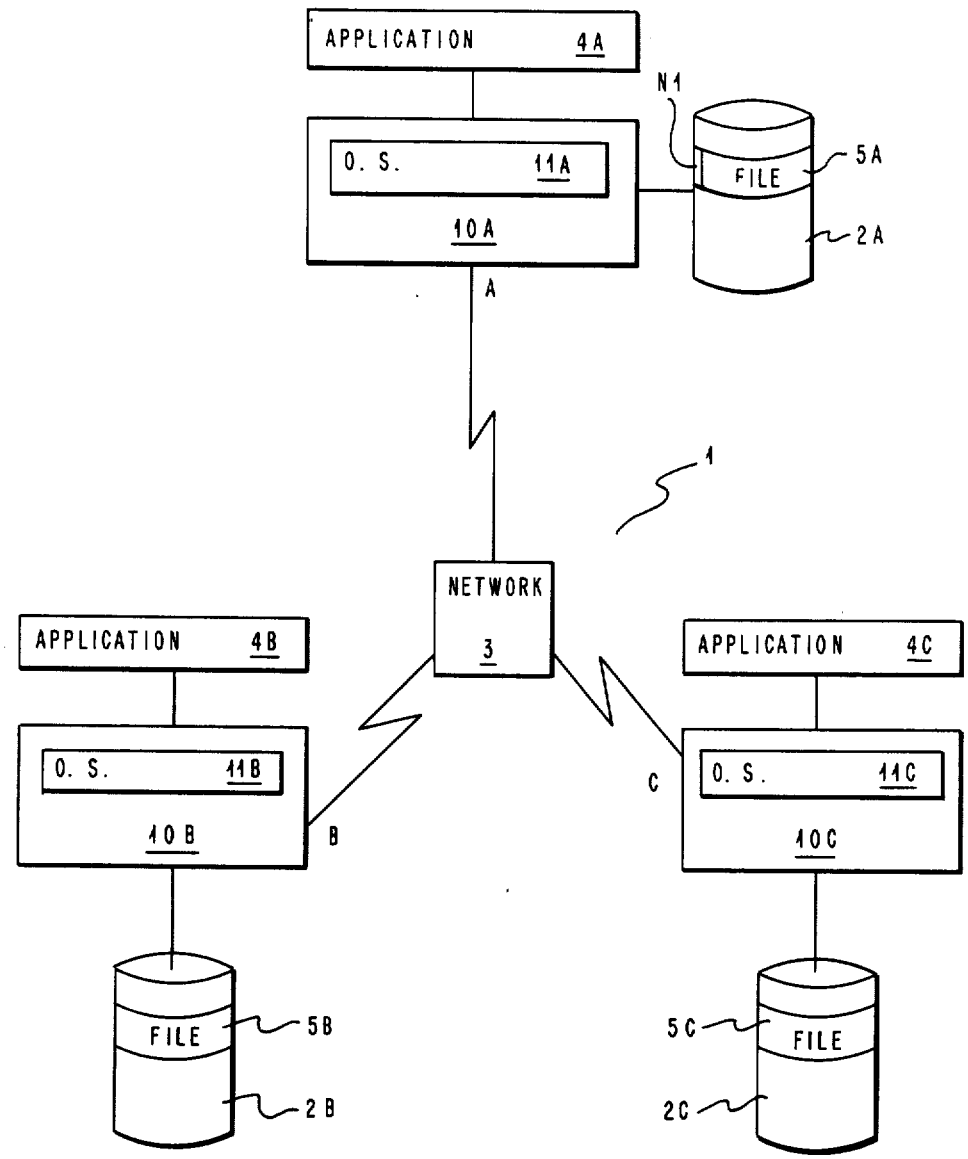
FIG. 1 shows three processing systems connected in a networking environment as known in the art.

The foregoing illustrates the data structure for standalone operation. Reference is now made to FIG. 4 which shows a distributed system similar to that shown in FIG. 1 in which the operating system which supports the present invention has been implemented. In the following description, the term "server" is used to indicate the node where a file is permanently stored, and the term "client" is used to mean any other node having processes accessing the file. It is to be understood, however, that the term "server" does not mean a dedicated server as that term is used in some local area network systems. The distributed services system in which the invention is implemented is a truly distributed system supporting a wide variety of applications running at different nodes in the system which may access files located anywhere in the system.

Figure 14:
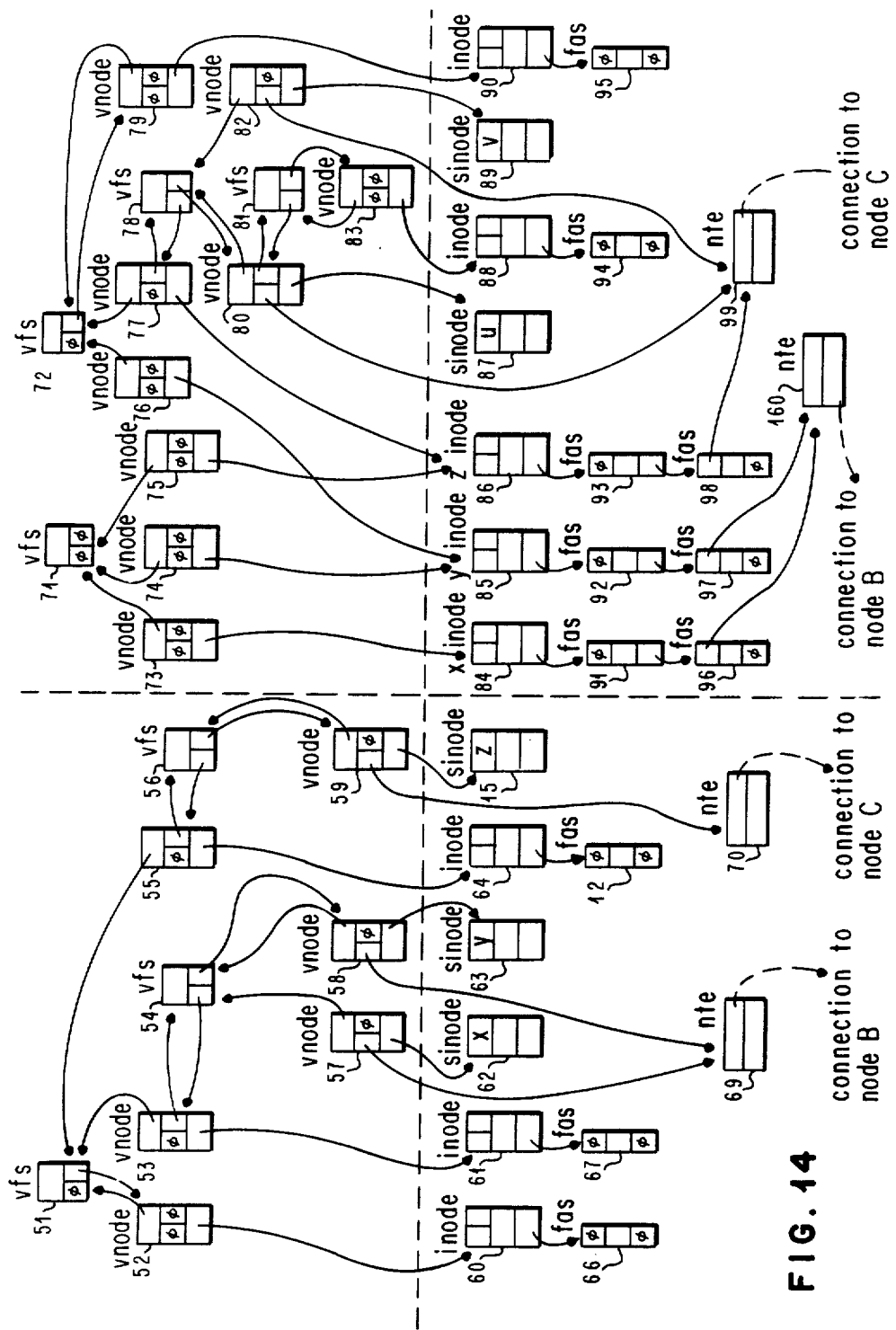
FIG. 14 is a block diagram of the data structure for the distributed file system shown in FIG. 4.
Figure 15A:
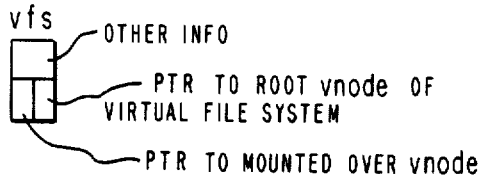
FIGS. 15A to 15F are block diagrams of component parts of the data structure shown in FIG. 14.
Figure 15B:
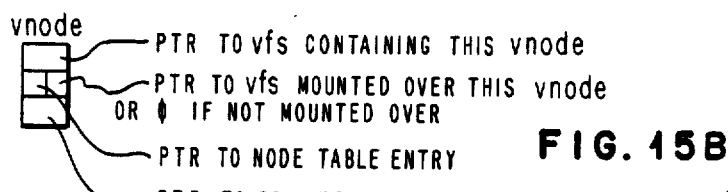
Figure 15C:
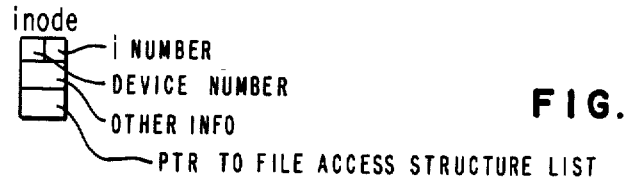
Figure 15D:
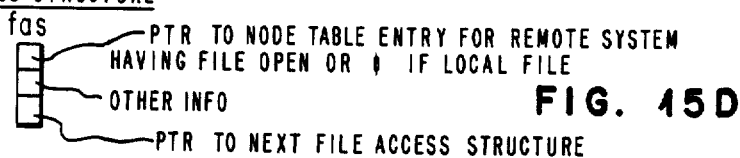
Figure 15E:
Figure 15F:
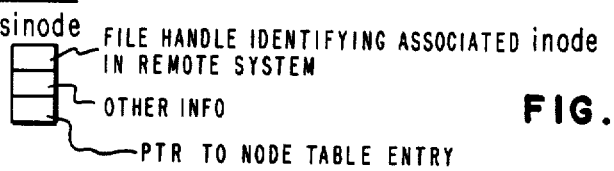
Figure 47:
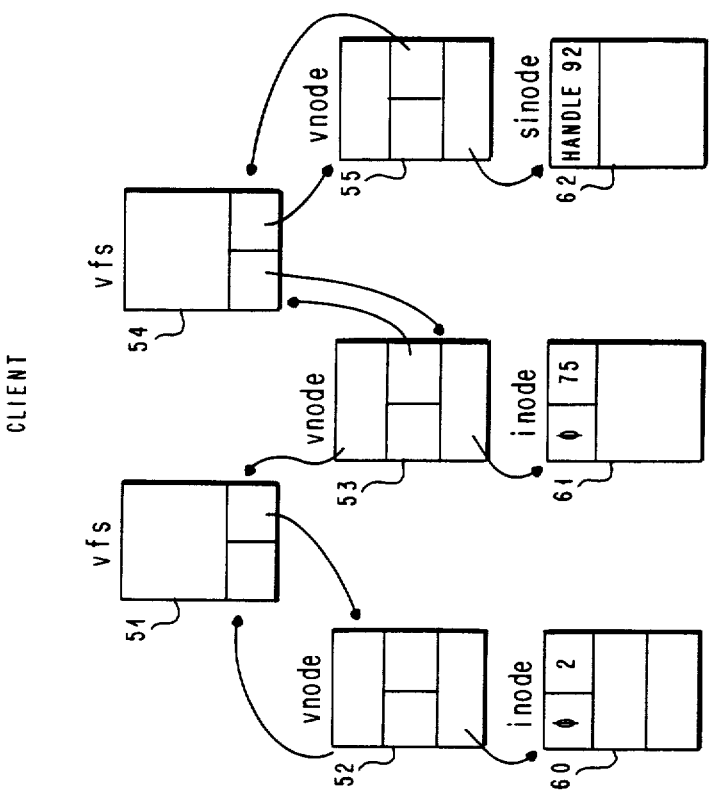

The data structure for the distributed system shown in FIG. 4 is illustrated in FIG. 14, and the component parts of that data structure are shown in FIGS. 15A to 15F. With reference to FIG. 14, a client node may have access to files which reside in a remote server node. Such a client gains access to a server's files by mounting one of the server's files. In the client node, the data structures created by a remote mount operation compare to those created by mounting a local entity in the following ways: Just as in the local case, a remote mount creates a vfs in the client node (e.g., block 54). Just as in the local case, use of a file in a virtual file system which contains remote files creates a vnode structure in the client node (e.g., block 57). Just as in the local case, the vnode structure has a pointer to a inode table entry (e.g., block 63). The inode table entry, however, does not contain the inode information from the remote file. Instead, the inode table entry contains a surrogate inode. This surrogate inode stands for, or represents, the remote inode.

In the server node, some data structures are constructed to allow the server to record state information about how remote nodes are using its files. More specifically, each server has a "dummy vfs" (e.g., block 71) to provide a vfs to hold files open by remote clients. The dummy vfs is not a part of the server's file tree. For each file which is open by a remote node, there is a vnode (e.g., block 74) in the server's dummy vfs. Each file which is open by a remote node has an inode table entry in the server's inode table (e.g., block 85). This inode table entry is the same as that which exists because a local process at the server has a file open. For example, block 84, which is in the table because of a remote open, has the same structure as block 88, which is in the table because of an operation at the server.

When a client and server communicate about a server file, they need a way to identify the file. This is done with a file handle. When a client request causes the server to reply with a designation of a particular file (e.g., a remote lookup request), the file is identified by a file handle. When a client request carries a designation of a particular file (e.g., a remote open request), the file is identified by a file handle. The file handle contains the following fields: device number, inode number, and inode generation number.

The need for a file handle is illustrated by the following scenario. Suppose a client makes a request of a server and gets a file handle in reply. The client stores and remembers the file handle. Some activity at the server causes the file to be deleted and the inode slot reused for another file. The client makes a request of the server using the stored file handle. The server receives the file handle and performs the operation on the new file. This would be an unacceptable operation.

This flaw is prevented by use of the inode generation number. The inode generation number is stored on disk as a field in the inode. When the server deletes a file, it increments the inode generation number. If a request arrives at a server, the file handle is broken apart, the device number and inode number are used to locate the inode, and then the file handle inode generation number is compared to the inode's inode generation number. If they are different, then the request is rejected.

When a client wants to open a file which resides on a remote server, it uses a network transport mechanism to establish a connection with the server. Subsequent transactions regarding this file (e.g., read, write, etc.) flow on this connection. Each node contains a node table. A node uses entries in its node table (e.g., block 70) to record information about existing connections to remote nodes.

There are a limited number of operations that one node in the network can request another node to perform on its behalf. These operations are called dfs_ops. When a node makes a request of another node, the following operations occur: First, the requesting node sends a message which specifies which dfs_operation is being requested and carries the parameters appropriate to that request. Next, the receiving node receives the request and performs the specified operation. Finally, the receiving node sends a message which carries the reply parameters appropriate for the dfs_operation.

There is a close correlation between the vn_ops that are issued within a local node to a file system and the dfs_ops that are issued over the network. A typical operation on a remote file is as follows: First, a local kernel issues a vn_op, not knowing whether the file being operated on is remote or local. Second, since the file resides in a remote node, the file system implementation code sends the corresponding dfs_op to the node which holds the file. Note that if the file had been a local file, the operation would have been performed, the return parameters would have been returned, and the task would have been complete. Third, the node which holds the file receives the dfs_operation request and requests its local file system to perform the corresponding vn_operation. The return parameters from this vn_op are used to construct the return parameters for the dfs_op. Fourth, the requesting node receives the dfs_op reply from the server node and uses the dfs_op return parameters to construct the return parameters to the original vn_operation request.

The operation will be illustrated by describing the scenarios of mounting a remote file over a local file and following a path to a file. In the first scenario, suppose that an application process in a client node issues a "mount" system call to mount a server node's file "/u/gorp" over the local client file "/etc/foo". The following scenario explains how this request is accomplished. This scenario refers to FIG. 16, which represents the initial conditions, and to FIG. 17, which represents the final condition, with the following assumptions: The vfs represented by block 51 is the root virtual file system of the server's file tree, and all the server directories and files involved are on the same device. The following entries exist in the indicated directories:

| Server Node | | |
|---|---|---|
| DIRECTORY INODE NUMBER | NAME | INODE NUMBER |
| 2 | "u" | 15 |
| 15 | "gorp" | 92 |
| 92 | "file2" | 67 |

| Client Node | | |
|---|---|---|
| DIRECTORY INODE NUMBER | NAME | INODE NUMBER |
| 2 | "etc" | 83 |
| 83 | "foo" | 75 |

The code which implements the mount system calls lookuppn to follow the path to the file which is to be mounted over—"/etc/foo". At the completion of this operation, the root vfs (block 51) contains a vnode for "/etc/foo" (block 53) which has a pointer to the root vfs (block 51) and a pointer to an inode table entry (block 61) for inode 75. Since the file being mounted resides in a remote node, a dfs_mount request is issued to the server node, passing the path "/u/gorp" as the path to the object to be mounted. Upon receiving the dfs_mount request, the server node calls lookuppn to follow the path to the file which is to be mounted—"/u/gorp". At the completion of this lookup operation, the server's root vfs (block 71) contains a vnode for "/u/gorp" which has a pointer to the root vfs and pointer to an inode table entry for inode 92. The server uses the information in the inode (device 0, inode 92) to construct a file handle for the file "/u/gorp". The server returns this file handle in the reply to the dfs_mount request and then releases the vnode and inode. Finally, the client receives the file handle in the reply to the dfs_mount request and performs the operations necessary to create the new virtual file system as follows:

(a) Create a new vfs (block 54).
(b) Create a root vnode for this vfs (block 55) with a pointer back to its parent vfs (block 54) and a pointer to the root inode of the vfs (block 62). Since the root inode of this vfs is a remote file, the inode pointed to from the root vnode is a surrogate inode. This surrogate inode contains the file handle returned by the server in response to the client's dfs_mount request.
(c) Install a "mounted over" pointer in the covered vnode (block 53) in the root vfs (block 51).
(d) Install in the new vfs (block 54) a pointer to the vnode upon which it is mounted (block 53).

Suppose now that after executing the remote mount described above (mount server /u/gorp over client etc/foo) a client process issues a system call to operate on the file "/etc/foo/file2". The block numbers in the following scenario refer to FIG. 17, which represents initial conditions, and FIG. 18, which represents the system state after the open operation. First, the code which implements the system call calls lookuppn to follow the path. Lookuppn starts at the root vnode (block 52) of the root virtual file system (block 51) and calls vn_lookup to look up the name "u" in the directory file represented by this vnode. Vn_lookup finds in the directory that the name "u" is associated with inode 15. Vn_lookup constructs a vnode and inode in the root virtual file system for inode 15 and returns to lookupnn a pointer to this vnode. Lookuppn calls vn lookup again, this time to look up the name "foo" in the directory identified by inode 15. Vn_lookup reads the indicated directory and discovers that the name "foo" is associated with inode 75 in block 61. There already exists in the root vfs (block 51) a vnode (block 53) for this inode (block 61), so vn_lookup returns a pointer to this vnode. Lookuppn discovers that the vnode is mounted over (the "mounted over" pointer in block 53 points to block 54). Lookuppn thus follows the "mounted over" pointer to the next vfs (block 54) and follows its root vnode pointer to the root vnode (block 55) of the virtual file system. Lookuppn now calls vn_lookup for the next element ("file2") of the path giving vn_lookup a pointer to block 55 and the name "file2". The directory to be searched resides in a remote node and is identified by the file handle stored in the client surrogate inode (block 62). Vn_lookup issues a dfs_lookup to the server which holds the file, sending the file handle which identifies the directory and the name ("file2") which is to be looked up. When the server receives the dfs_lookup, it uses the file handle to identify the directory to be read and issues a vn_lookup to search for the name "file2" in this directory. Vn_lookup reads the directory and discovers that the inode number associated with the name "file2" is 67. Vn_lookup constructs a vnode and inode in the dummy virtual file system for inode 67 and returns to lookuppn a pointer to this vnode. Dfs_lookup uses the information in data structures returned by vn_lookup to construct a file handle for the file identified by inode 67. It returns this file handle to the client, as the reply to the dfs_lookup request, and releases the vnode and inode. In the client, a vnode (block 55) and surrogate inode (block 63) are created for the found file. Since "file2" is the last piece of the path, lookuppn returns to its caller a pointer to the found vnode (block 55). The code which implements the system call now performs the requested operation on the file.

The reason for following the path /etc/foo/file2 was to open the file identified by that path. In this case the caller of lookuppn is the code which implements the open system call. When lookuppn returns the found vnode pointer the processing necessary to open the file must be done.

This open may, or may not, change the file's cache sync mode. The flow of the open operation, as indicated in earlier discussions, depends on what, if any, cache sync mode transition must be performed. The following scenarios trace the open operation for two interesting sync mode changes: (1) from ASYNC sync mode to FULLSYNC, and (2) from READONLY to FULLSYNC.

An ASYNC to FULLSYNC scenario

Assumptions:
1. The file is open in ASYNC sync mode from client_A.
2. A new open is being requested from client_B. This open is for writing and will drive the file to FULLSYNC s_mode.

The Scenario:
1. Client B_'s open logic starts with the vnode pointer returned by lookuppn.
2. Client_B follows this pointer to the inode and discovers that it is a surrogate inode which contains a file handle.

3. Client_B finds the node table entry associated with this surrogate and sends dfs_open request to the server node.

4. Since the file is already open from client_A, the server already has for this file a vnode in its dummy vfs and an inode in its inode table. The inode has a pointer to a file access structure which describes the open from client_A. The server uses the file handle received in the dfs_open request to locate the vnode in its dummy vfs.

5. The server issues a vn_open request to its local file system.

6. Vn_open adds a file access structure to the file access structure list for this client. Vn_open reads the inode's file access structures and discovers that the file is already open in client_A and the file is in ASYNC s_mode. Since the request is for a write open from a different client, client_B, the file's sync mode must be changed to FULLSYNC.

7. The server sends a dfs_change_sync_mode request to client_A. The dfs_change_sync_mode contains the file handle, to identify the file, and the new sync mode.

8. Client_A uses the file handle in the dfs_change_sync_mode request to locate its vnode and surrogate inode for the file.

9. Client_A locates each of the file's blocks which it has in its cache. It writes the modified ones back to the server and discards the unmodified ones.

10. When client_A has written all of the modified blocks to the server and received confirmation replies from the server, it installs the new sync mode, FULLSYNC, in its surrogate inode.

11. Client_A sends to the server an acknowledgement reply to the server's dfs_change_sync_mode request.

12. The server receives client_A's reply that client_A's sync mode change is complete.

13. The server sends client_B a dfs_change_sync_mode message to inform the client of the file's sync mode.

14. Client_B installs the sync mode, FULLSYNC, in its surrogate inode and sends an acknowledgement reply to the server.

15. The server sends to client_B a reply to its original dfs_open request.

16. Client_B receives the server's reply and returns the caller of the open system call. The open is complete.

A READONLY to FULLSYNC scenario

Assumptions:

1. The file is open in READONLY sync mode from clients client_R1 and client_R2.

2. A new open is being requested from client_B. This open is for writing and will drive the file to FULLSYNC s_mode.

The Scenario:

1. Client_B's open logic starts with the vnode pointer returned by lookuppn.

2. Client_B follows this pointer to the inode and discovers that it is a surrogate inode which contains a file handle.

3. Client_B finds the node table entry associated with this surrogate and sends dfs_open request to the server node.

4. Since the file is already open from client_R1 and client_R2, the server already has for this file a vnode in its dummy vfs and an inode in its inode table. The inode has a pointer to a list of file access structures which describe the opens from client_R1 and client_R2. The server uses the file handle received in the dfs_open request to locate the vnode in its dummy vfs.

5. The server issues a vn_open to its local file system.

6. Vn_open adds a file access structure for client_B to the file access structure list. Vn_open reads the inode's file access structures. It discovers that the file is already open in client_R1 and client_R2 and that the file is in READONLY s_mode. Since the request is for a write open, the file's sync mode must be changed to FULLSYNC.

7. The server sends a dfs_change_sync_mode request to client_R1. The dfs_change_sync_mode contains the file handle, to identify the file, and the new sync mode.

8. Client_R1 uses the file handle in the dfs_change_sync_mode request to locate its vnode and surrogate inode for the file.

9. Client_R1 locates each of the file's blocks which it has in its cache and discards them. (Since the file is in READONLY sync mode there can be no modified blocks.)

10. Client_R1 installs the new sync mode, FULLSYNC, in its surrogate inode.

11. Client_R1 sends to the server an acknowledgement reply to the server's dfs_change_sync_mode request.

12. The server receives Client_R1's reply that client_R1's sync mode change is complete.

13. The server now, in a similar manner, informs client_R2 of the needed sync mode change.

14. The server sends client_B a dfs_change_sync_mode message to inform the client of the file's sync mode.

15. Client_B installs the sync mode, FULLSYNC, in its surrogate inode and sends an acknowledgement reply to the server.

16. The server sends to client_B a reply to its original dfs_open request.

17. Client_B receives the server's reply and returns the call of the open system call. The open is complete.

The following pseudo code illustrates the open operation in a sync mode change:

| function vnopen for a server file |
|---|
| inputs: vnode pointer for file to be opened |
| open flags — read only, |
| read/write, etc. |
| create mode — file mode bits |
| if creating |
| output: return code indicating success |
| or failure |
| get pointer to file's inode from vnode; |
| lock file access structure lock |
| lock inode; |
| if ( not permitted access ) |
| unlock inode; |
| return( error ); |
| get the file access structure for |
| this client; |
| — if there is no file access |
| structure, allocate one |
| if( didn't get the file access |
| structure ) |
| unlock inode; |
| return( error ); |
| update file access structure read-only, |
| and read-write counts. |
| if( truncate mode is set ) |
| truncate file; |
| unlock the inode; |
| if(the file being opened is a block |

-continued
function vnopen for a server file

```
special file)
  recalculate the smode of each file on the
  device and update if necessary
else
  call update_sync_mode( )
  unlock file access structure lock
update_sync_mode( )
  inputs: vnode pointer for file to be opened
  open flags — read only,
  read/write, etc.
  Calculate the number of remote and local nodes
  that have the file open, open read_only,
  or open read_write
  if(there are no opens)
    goto out
  if(one or more local processes have the file open
  and at least one of the opens is for
  read_write access)
    smode = FULLSYNC
    goto out
  if(more then one node has the file open and at
  least one of the opens is read_write)
    smode = FULLSYNC
    goto out
  if(enforced locking is set)
    smode = FULLSYNC
    goto out
  if(the device which holds the file is closed)
  if(no local processes have the file open)
  if(only one remote node has the file open
  and at least one open is for read_write)
    smode = ASYNC
    goto out
    smode = READONLY
    goto out
  if(the device which holds the file is
  open read_only)
  if(no local or remote opens are read_write)
    smode = READONLY
    goto out
    smode = FULLSYNC
out:
  if(the current smode is the same as the new smode)
    return;
  Update the inode's smode field with the new smode
  if(the smode is NULL)
    return;
  for(each remote node in the file access
  structure list)
    send message to the node informing it of
    the new sync mode
    wait reply
```

FILE ACCESS STRUCTURE LOCK

The file access structure lock fas_lock is used to synchronize the use of the inodes and surrogate inodes (s_inode) for open files in a distributed file system (DFS). The synchronization is performed to avoid a deadlock situation which can occur if an inode and the s_inodes are locked. The file access structure lock is described in the following commonly assigned and co-pending patent application Ser. No. 06/014,900 filed by Johnson et al. for *Distributed File Access Structure Lock* which is hereby incorporated by reference.

In a standalone AIX operating system, execution of system calls that require access to a file F are serialized by locking the inode for F during the entire execution time of any system call for that file. In DFS, if file F is open at a remote node C, a s_inode is created at node C to represent file F. Thus, two resources are involved: the inode for the specific file at the server node where the file resides, and the s_inode at the client node where the file is open. To serialize system calls executing at client C, the s_inode for file F is locked during the execution time for each call. If an access to the server is required to read a block of data not available in the client cache, the inode for file F is also locked.

Locking the inode for file F in the server and the s_inode for file F in the client for the entire execution time of each system call can lead to a deadlock situation if the order in which the two resources are acquired is not always carried out in the same order. Typically, the s_inode is locked first and then the server is accessed via a remote procedure call (RPC) and the inode is locked. However, there are some exceptions to the above order. Under certain conditions, the server may lock the inode and then send a RPC to the client which requires the locking of the s_inode.

Figure 20:
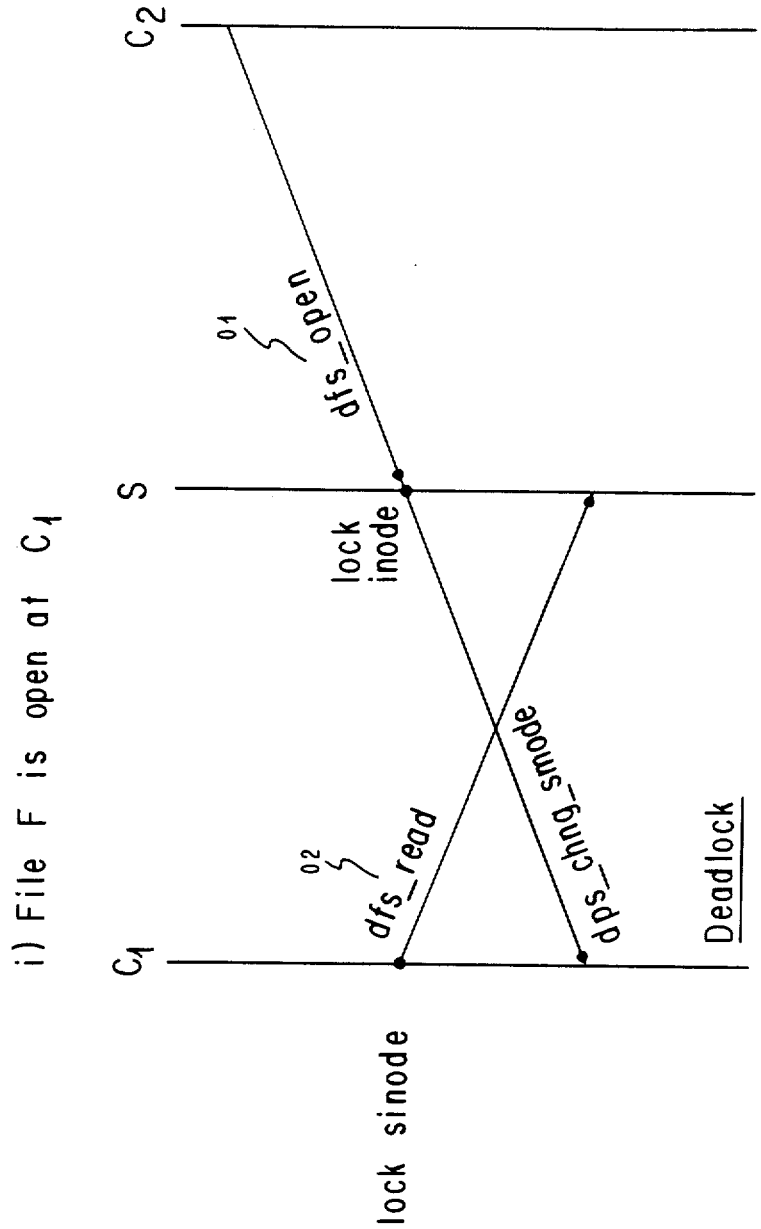
FIG. 20 is a diagram showing a deadlock when two operations are currently executing.

A deadlock can occur in any one of the following situations in which two operations are currently executing 01 and 02, as shown in FIG. 20, where 01 is a read operation, and 02 is an open operation:

(a) 01 is executing at a client node. 01 locks the s_inode and tries to lock the inode in the server for a read operation.

(b) 02 is executing in the server. 02 locks the inode and initiates a RPC to the client node to open a file. The execution of the RPC request in the client node waits on the s_inode to lock it.

Because both operations are executing and require the same two resources and each have acquired one and are waiting on the other locked resource, a deadlock situation is present. In examining the cause, note that the deadlock occurs during the execution of the RPC from the server to the client. The inode on the server is locked first and an attempt is made to lock the s_inode. This is the reverse of most cases where the s_inode is locked first and then sends a RPC to lock the inode.

To prevent the above problem from occurring, the server could unlock the inode before originating a RPC to lock the s_inode to the client. Unlocking the inode during the execution of the open operation will solve the above problem; however, it complicates the sync mode change management for open files since more than one open and/or close operation can occur at the server in parallel. It may also introduce another problem as shown in FIG. 19. In FIG. 19 file F at 10 is open in ASYNC mode by only one process in client node C-1 at 20. Two operations are in progress: a close operation from C-1 at 20 and an open operation at 60 for the same file F at label 10 from another client C-2 at label 40. The close operation from C-1 at label 20 will lock the s_inode (which has a use count of 1) and sends a "dfs_close" RPC at label 50 to the server at label 30. The open operation from C-2 at label 40 sends a "dfs_open" RPC at label 70 to the server at label 30. This RPC arrives at the server and executes before the "dfs_close" RPC at label 50 from C-1 at label 20. The s_mode for file F is ASYNC, so the server unlocks the inode and sends a "dfs_chng_sync_mode" RPC at label 80 to C-1 at label 20 requesting that file F at label 10 be changed to FULLSYNC s_mode. This RPC will arrive at C-1 at label 20 and wait for the s_inode to be unlocked. Next, the "dfs_close" RPC at label 50 arrives at the server. Since the inode for file F at label 10 is not locked at the server, the close operation executes at the server and a "dfs_close_ack" RPC at label 90 is sent to C-1 at label 20. When the "dfs_close_ack" RPC at label 90 arrives at C-1 at label 20, the use count on the s_inode is decremented and since the use count's value is zero, the s_inode is released at label 100. This leaves no s_inode for the sync mode change to be applied to in C-1 in label 20.

A solution to this problem is to have the sync mode change procedure increment the use count of the s_inode before waiting on it. However, this approach raises more management headaches for the file management system, since at this time file F is not open at C-1 and its s_mode is not FULLSYNC. A better approach is to introduce a new lock, the file access structure lock (fas_lock) to serialize operations which accesses or changes the access list to a file. Use of the fas_lock will eliminate the inode from being a critical resource. The two critical resources will be the s_inode in the client node and the fas_lock at the server. To prevent a deadlock, any operation executing at a client node which requires holding the fas_lock should unlock the s_inode before a RPC is sent to the server.

Operations that may generate an RPC from the server to clients must acquire the fas_lock before it starts executing in the server. Examples of situations in a UNIX operating system and/or an AIX operating system environment are: Remote Procedure Calls (RPC):

| * DFS_OPEN | * DFS_CREATE |
|---|---|
| * DFS_CLOSE | * DFS_GET_ATTR |
| * DFS_SET_ATTR | * DFS_LOOKUP |
| * DFS_CHNG_SYNC_MODE System Calls | |
| From Server Processes: | |
| * OPEN | * CLOSE |
| * CREAT | * STAT |
| * FULLSTAT | * CHMOD |
| * EXIT | |
| The above UNIX operating system and AIX operating system operations correspond to the following vn_ops: | |
| * vn_open | * vn_create |
| * vn_close | * vn_getattr |
| * vn_setattr | * vn_lookup |

Figure 21:
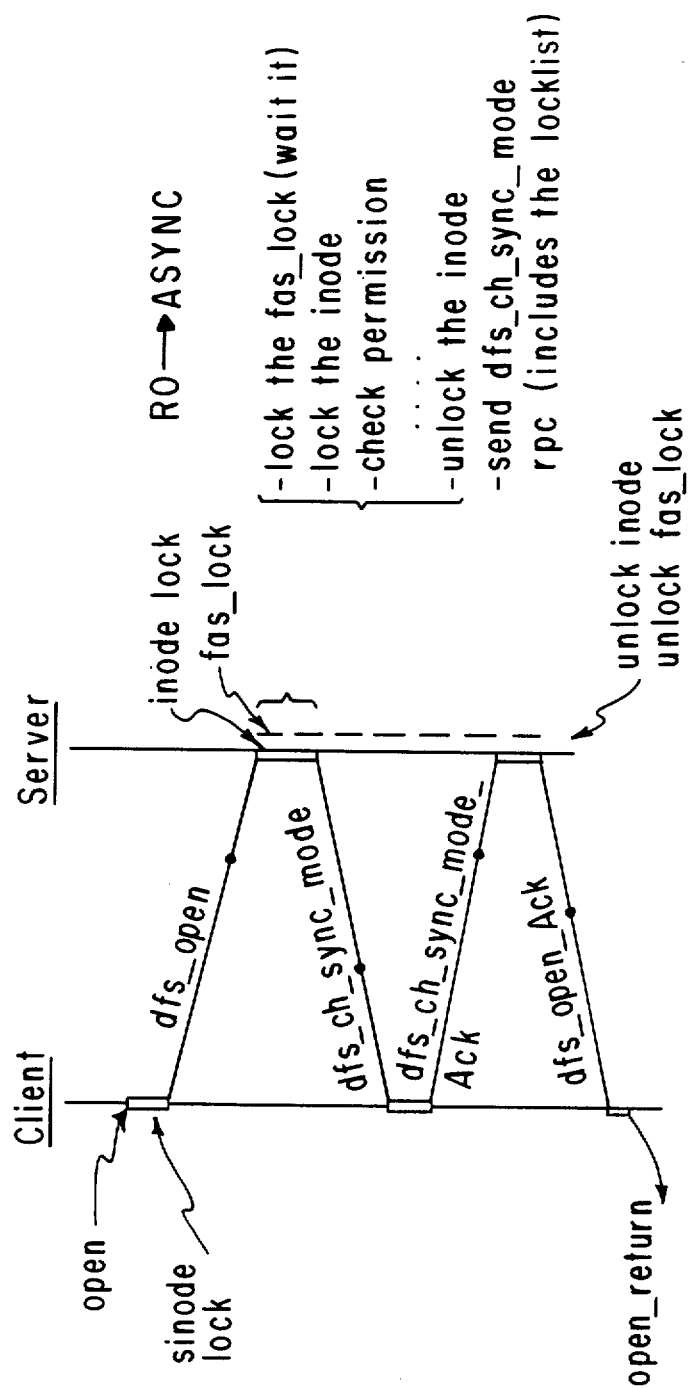
FIG. 21 is a diagram showing the execution steps of an open request from a client node.

An example of a vn_ops execution is discussed below and shown in FIG. 21. The operation (an open) is executed at a client node and locks the s_inode as usual if any local processing is necessary. If one of the above listed RPCs (dfs_open) is sent to the server, then the s_inode is unlocked before the RPC is sent. In the server, the RPC request will lock the fas_lock or wait on it if it is busy, then it will lock the inode for a file F. If it is a local server operation, the executing process will acquire the fas_lock and then lock the inode. If a DFS_CHNG_SYNC_MODE or a DFS_GET_ATTR_RPC is sent from a server to a client, then the inode is unlocked before sending the RPC. Thus, the server can accept read and write operations after the RPC is sent. When the response messages from all the clients are received, the server locks the inode to finish any remaining local processing. If the operation was initiated at a client node, an acknowledgement is sent to that client. The inode is then unlocked and the fas_lock is released.

The fas_lock provides the means to synchronize the inode use and avoid deadlock operations. The fas_lock synchronizes the access to the file access structure list containing information about the nodes that have the file open. The fas_lock is locked when a process opens or closes a file, or when the file access structure list is being interrogated. The fas_lock is also locked during a write operation when the file is in FULLSYNC mode.

The inode lock synchronizes access to the data in the file at the server. The inode lock is locked during a read or write operation to the file in the server. The inode lock is unlocked before the server sends a remote procedure call to the client, if the remote procedure call requires a lock on the s_inode lock.

The s_inode lock synchronizes the file access within a client process. The s_inode is locked if an operation at the client is accessing the file. The s_inode is unlocked if the operation at the client locks the fas_lock. The s_inode is also unlocked before a remote procedure call is sent from the client to the server.

If both the fas_lock and the inode lock are locked, the inode lock is unlocked before the server originates a remote procedure call to the client. This allows the fas_lock and s_inode lock to be locked. The locks are unlocked in the reverse sequence that they became locked.

While the invention has been described in terms of a preferred embodiment in a specific operating system environment, those skilled in the art will recognize that the invention can be practiced, with modification, in other and different operating systems within the spirit and scope of the appended claims. It also will be understood by those skilled in the art that other changes in form and detail may be made without departing from the spirit and scope of the invention.

Having thus described our invention, what we claim as new and desire to secure by Letters Patent is set forth in the following claims:

1. A system for accessing a file residing in a server processing system at a server node by at least one client processing system at least one client node, said system comprising:
   at least one client cache in the at least one client processing system caching blocks of the file at the at least one client node;
   means for generating a file synchronization mode for the file, said file synchronization mode being dependent upon how many and which processes in the network have the file open, and whether the file is open for read only or write access; and
   means for managing said at least one client cache through the file synchronization mode.

2. The system as in claim 1 wherein the file synchronization mode is a first file mode if all opens for the file are at only one client node, and at least one of the opens is for write access.

3. The system of claim 1 wherein the file synchronization mode is a second file mode if the file is only open for read only access.

4. The system of claim 1 wherein the file synchronization mode is a third file mode if the file is open by processes executing at more than one node, and the file is open for write access by at least one process executing in at least one node.

5. The system of claim 1 wherein the file synchronization mode is a third file mode if a device containing the file is open for write access.

6. The system of claim 2 or 3 wherein the at least one client cache is accessed for a read access to the file.

7. The system of claim 2 wherein the at least one client cache is accessed for a write access to the file.

8. The system of claim 4 or 5 wherein the server processing system is accessed for a read access to the file.

9. The system of claim 4 or 5 wherein the server processing system is accessed for a write access to the file.

10. A method, in a data processing system having at least one node, for accessing a file residing in a server processing system at a server node by at least one client processing system at least on client node, said method comprising the steps of:
  generating at least one synchronization mode for the file, said synchronization mode being dependent upon how many and which processes in the network have the file open, and whether the file is open for read only or write access; and
  caching the file at the at least one client node in at least one client cache as determined by said generated synchronization mode; and
  managing access to said at least one client cache as determined by said generated synchronization mode.

11. The method of claim 10 wherein a first synchronization mode is generated if all opens for the file are at one client node, and at least one of the opens is for write access.

12. The method of claim 10 wherein a second synchronization mode is generated if the file is only open for read only access.

13. The method of claim 10 wherein a third synchronization mode is generated if the file is open by processes executing at more than one node, and the file is open for write access by at least one process executing in at least one node.

14. The method of claim 10 wherein a third synchronization mode is generated if a device containing the file is open for write access.

15. The method of claim 11 or 12 further comprising the step of accessing the client cache for a read access to the file.

16. The method of claim 11 further comprising the step of accessing the client cache for a write access to the file.

17. The method of claim 13 or 14 further comprising the step of accessing the server processing system for a read access to the file.

18. The method of claim 13 or 14 further comprising the step of accessing the server processing system for a write access to the file.

19. A system for accessing a file residing in a server processing system at a server node by at least one client processing system at least one client node, said system comprising:
  means for creating at least one client cache in the at least one client processing system for caching blocks of the file at the at least one client node;
  means for classifying said file dependent upon which of a plurality of nodes have the file open, and which of a plurality of processes at each of said nodes have the file open for writes, and which of the processes at each of said nodes have the file open for reads;
  means for accessing said file from said at least one client cache in response to a first classification of said classifying means; and
  means for accessing said file from said server processing system in response to a second classification of said classifying means.

20. A method for accessing a file residing in a server processing system at a server node by at least one client processing system at least one client node, said method comprising:
  creating at least one client cache in the at least one client processing system for caching blocks of the file at the at least one client node;
  classifying said file dependent upon which of a plurality of nodes have the file open, and which of a plurality of processes at each of said nodes have the file open for writes, and which of the processes at each of said nodes have the file open for reads;
  accessing said file from said at least one client cache in response to a first classification of said classifying means; and
  accessing said file from said server processing system in response to a second classification of said classifying means.

21. A computer program product having a computer readable medium having a computer program recorded thereon for accessing a file residing in a server processing system at a server node by at least one client processing system at least one client node, said computer program product comprising:
  means for creating at least one client cache in the at least one client processing system for caching blocks of the file at the at least one client node;
  means for classifying said file dependent upon which of a plurality of nodes have the file open, and which of a plurality of processes at each of said nodes have the file open for writes, and which of the processes at each of said nodes have the file open for reads;
  means for accessing said file from said at least one client cache in response to a first classification of said classifying means; and
  means for accessing said file from said server processing system in response to a second classification of said classifying means.

* * * * *

UNITED STATES PATENT AND TRADEMARK OFFICE
CERTIFICATE OF CORRECTION

PATENT NO. : 4,887,204

DATED : December 12, 1989

INVENTOR(S) : D. W. Johnson et al

It is certified that error appears in the above-identified patent and that said Letters Patent is hereby corrected as shown below:

Col. 26, line 31, before 'at' insert --at--.

Col. 26, line 34, before 'caching' insert --for--.

Col. 27, line 4, before 'at' insert --at--.

Col. 27, line 4, delete "on" and insert --one--.

Col. 27, line 48, before 'at' insert --at--.

Col. 28, line 15, before 'at' insert --at--.

Col. 28, line 35, before 'at' insert --at--.

Signed and Sealed this

Twenty-first Day of April, 1992

Attest:

HARRY F. MANBECK, JR.

*Attesting Officer*  *Commissioner of Patents and Trademarks*